(12) United States Patent
Liu et al.

(10) Patent No.: US 12,276,789 B2
(45) Date of Patent: Apr. 15, 2025

(54) FREEFORM OPTICAL LENS INTEGRATION WITH VISORS FOR NEAR-EYE DISPLAYS

(71) Applicant: Huawei Technologies Co., Ltd., Shenzhen (CN)

(72) Inventors: Zhiqiang Liu, Plano, TX (US); Akash Arora, Plano, TX (US); Jie Dai, Plano, TX (US); Angus Wu, Plano, TX (US); Jiang Li, Plano, TX (US); Peng Zhang, Plano, TX (US); Gangok Lee, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 741 days.

(21) Appl. No.: 17/497,715

(22) Filed: Oct. 8, 2021

(65) Prior Publication Data
US 2022/0026722 A1 Jan. 27, 2022

Related U.S. Application Data

(63) Continuation of application No. PCT/US2019/027845, filed on Apr. 17, 2019.

(51) Int. Cl.
*G02B 27/01* (2006.01)
*B29D 11/00* (2006.01)
*G02C 11/00* (2006.01)

(52) U.S. Cl.
CPC ...... *G02B 27/0172* (2013.01); *B29D 11/0048* (2013.01); *G02C 11/10* (2013.01); *G02B 2027/013* (2013.01); *G02B 2027/0178* (2013.01)

(58) Field of Classification Search
CPC ........ G02B 27/0172; G02B 2027/0178; G02B 27/017; G02B 2027/013; B29D 11/0048
See application file for complete search history.

(56) References Cited

U.S. PATENT DOCUMENTS

| | | | |
|---|---|---|---|
| 6,088,165 A | 7/2000 | Janeczko et al. | |
| 9,529,196 B1 | 12/2016 | Sade | |
| 2010/0171922 A1 | 7/2010 | Sessner et al. | |
| 2012/0162549 A1 | 6/2012 | Gao et al. | |
| 2017/0293143 A1 | 10/2017 | Martinez et al. | |

FOREIGN PATENT DOCUMENTS

| | | |
|---|---|---|
| CN | 103688208 A | 3/2014 |
| CN | 107272198 A | 10/2017 |
| EP | 1202104 A1 | 5/2002 |

*Primary Examiner* — Ryan D Howard
(74) *Attorney, Agent, or Firm* — Conley Rose, P.C.

(57) ABSTRACT

A near-eye display (NED), comprising a frame comprising an outer lens, a micro-display panel coupled to the frame and comprising a processor configured to process content for display to a user wearing the NED, an augmented reality (AR) lens comprising a main prism lens, wherein the outer lens comprises at least one of a display corrector lens or a see-through corrector lens.

20 Claims, 17 Drawing Sheets

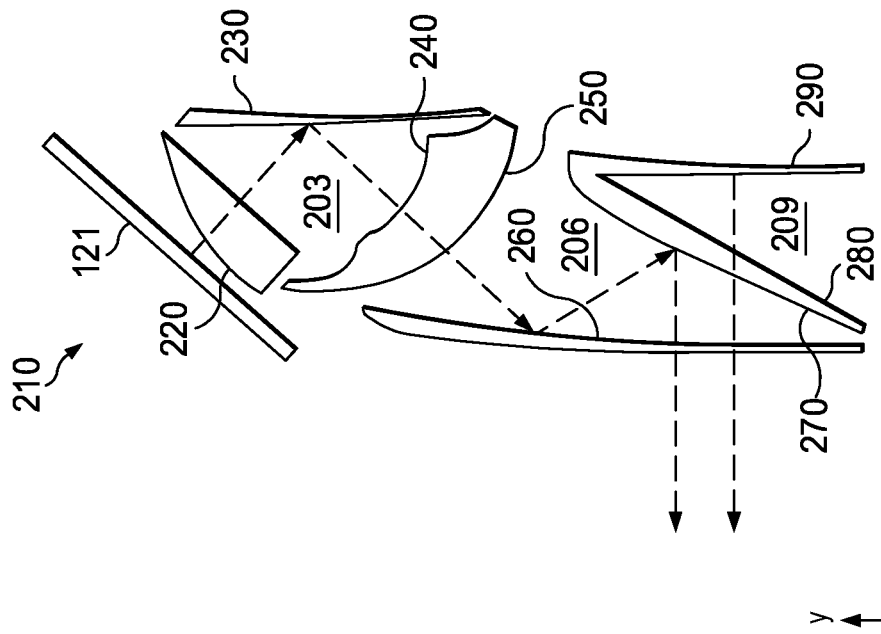
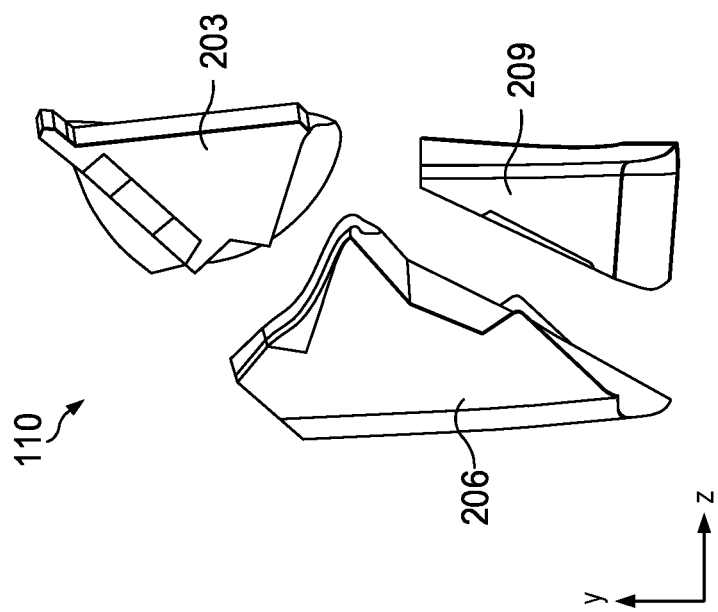
FIG. 2B
FIG. 2A

FREEFORM OPTICAL LENS INTEGRATION WITH VISORS FOR NEAR-EYE DISPLAYS

CROSS-REFERENCE TO RELATED APPLICATIONS

This application is a continuation of International Application No. PCT/US2019/027845 filed on Apr. 17, 2019 by Futurewei Technologies Inc., and titled "Freeform Optical Lens Integration with Visors for Near-Eye Displays," which is hereby incorporated by reference.

TECHNICAL FIELD

The disclosed embodiments relate to near-eye displays in general and optical architectures for near-eye displays in particular.

BACKGROUND

Near-eye displays (NEDs), which may also be referred to as head mounted displays (HMDs) or smart glasses, provide augmented reality (AR), mixed reality (MR), or virtual reality (VR) experiences by projecting computer-generated images into users' eyes to create virtual images in the users' field of views (FOVs). The computer-generated images are constructive, meaning they add to the users' natural environments, or the computer-generated images are destructive, meaning they mask the users' natural environments. The natural environments may be what the users see in their natural FOV. Thus, the users may see a combination of both the virtual images and the users' natural FOVs.

SUMMARY

According to a first aspect of the present disclosure, there is provided a near-eye display (NED). The NED comprises a frame comprising an outer lens, a micro-display panel coupled to the frame and comprising a processor configured to process content for display to a user wearing the NED, and an augmented reality (AR) lens comprising a main prism lens, wherein the outer lens comprises at least one of a display corrector lens or a see-through corrector lens.

In a first implementation of the NED according to the first aspect, the outer lens is detachably coupled to the AR lens.

In a second implementation of the NED according to the first aspect or any preceding implementation of the first aspect, the outer lens comprises a recess configured to receive and secure at least one of the display corrector lens or the see-through corrector lens of the AR lens.

In a third implementation of the NED according to the first aspect or any preceding implementation of the first aspect, the NED further comprises an edge that at least partially surrounds the AR lens.

In a fourth implementation of the NED according to the first aspect or any preceding implementation of the first aspect, an interior surface of the outer lens comprises a mirror surface.

In a fifth implementation of the NED according to the first aspect or any preceding implementation of the first aspect, the outer lens has a continuous surface and is convexly curved.

In a sixth implementation of the NED according to the first aspect or any preceding implementation of the first aspect, the outer lens comprises the display corrector lens, and wherein a surface of the main prism lens on the AR lens abuts a surface of the display corrector lens on the outer lens.

In a seventh implementation of the NED according to the first aspect or any preceding implementation of the first aspect, the outer lens comprises the see-through corrector lens, and wherein a surface of the main prism lens on the AR lens abuts a surface of the see-through corrector lens on the outer lens.

In an eighth implementation of the NED according to the first aspect or any preceding implementation of the first aspect, the content passes through a display corrector lens of the AR lens, the main prism lens, and the see-through corrector lens before being presented to the user with an external environment.

According to a second aspect of the present disclosure, there is provided a method for manufacturing a NED. The method comprises molding at least one of a display corrector lens or a see-through corrector lens to an outer lens of the NED, detachably coupling an augmented reality (AR) lens comprising a main prism lens to the outer lens, and attaching the outer lens and the AR lens to a frame of the NED, wherein the frame comprises a micro-display panel configured to process content for display to a user wearing the NED.

In a first implementation of the method according to the second aspect, tapering the bottom edge of the AR lens proximate to the see-through corrector lens comprises attaching a beveled edge to an optical area of the AR lens, wherein the optical area displays the content and light from an external environment to a user, and wherein the optical area comprises a portion of the main prism lens, the see-through corrector lens, and the bottom edge of the AR lens.

In a second implementation of the method according to the second aspect or any preceding implementation of the second aspect, wherein molding the at least one of the display corrector lens or the see-through corrector lens to the outer lens comprises molding the display corrector lens to the outer lens, and extending the display corrector lens to a bottom surface of the outer lens to form a continuous exterior surface of the outer lens.

In a third implementation of the method according to the second aspect or any preceding implementation of the second aspect, wherein molding the at least one of the display corrector lens or the see-through corrector lens to the outer lens comprises molding the see-through corrector lens to the outer lens, and extending the see-through corrector lens to a top surface of the outer lens to form a continuous exterior surface of the outer lens.

In a fourth implementation of the method according to the second aspect or any preceding implementation of the second aspect, the display corrector lens or the see-through corrector lens is molded to the outer lens using plastic injection molding.

According to a third aspect of the present disclosure, there is provided an NED, comprising an AR lens comprising a main prism lens, an outer lens detachably coupled to the AR lens and comprising at least one of a see-through corrector lens or a display corrector lens, and a micro-display panel coupled to the AR lens and the outer lens, wherein the micro-display panel is configured to process content for display to a user wearing the NED through the AR lens.

In a first implementation of the NED according to the third aspect, the outer lens comprises the see-through corrector lens, and wherein the AR lens comprises the main prism lens and the display corrector lens.

In a second implementation of the NED according to the third aspect or any preceding implementation of the third aspect, the outer lens comprises a display corrector lens positioned proximate to a top edge of the outer lens, and wherein the AR lens further comprises the main prism lens and the see-through corrector lens.

In a third implementation of the NED according to the third aspect or any preceding implementation of the third aspect, the outer lens comprises the see-through corrector lens and the display corrector lens.

In a fourth implementation of the NED according to the third aspect or any preceding implementation of the third aspect, the outer lens comprises a mirror surface and the see-through corrector lens, and wherein the AR lens comprises the main prism lens and the display corrector lens.

In a fifth implementation of the NED according to the third aspect or any preceding implementation of the third aspect, the outer lens comprises a mirror surface proximate to a top edge of the outer lens, and wherein the outer lens comprises the display corrector lens positioned below the mirror surface, and wherein the AR lens further comprises the main prism lens and the see-through corrector lens.

In a sixth implementation of the NED according to the third aspect or any preceding implementation of the third aspect, the outer lens comprises a mirror surface, the see-through corrector lens, and the display corrector lens.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2A is a diagram illustrating various prisms within an example AR lens of the NED according to various embodiments of the disclosure.

FIG. 2B is a ray diagram illustrating a display path within the prisms of the example AR lens shown in FIG. 2A according to various embodiments of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An NED, which is a specialized, head-mounted eyepiece device that provides a simulated visual environment through a freeform optics lens, allows the user to see both a digital display of produced content and the natural environment or external environment. Typically, the AR lens included in the NED is a freeform lens, which is a lens that is separate from a visor of the NED. In this way, each of the component prism lenses of the AR lens is also separated from the outer lens of the visor. Therefore, a typical NED includes a set of outer lenses and a set of AR lenses, and the set of outer lenses are separated from the set of AR lenses by a predefined distance.

The embodiments disclosed herein are directed to modifying the construction of the NED such that particular lenses normally included in an AR lens are instead integrated into an outer lens. In an embodiment, at least one of a display corrector lens or a see-through corrector lens is integrated with an outer lens. Thereafter, the outer lens having the integrated display corrector lens or the integrated see-through corrector lens is coupled to the AR lens to create a single integrated lens structure. By integrating the display corrector lens or the see-through corrector lens into the outer lens, the manufacturing of the NED becomes more efficient and cost effective. In addition, the shape of the NED with the integrated lens structure becomes more aesthetically appealing.

Figure 1A:
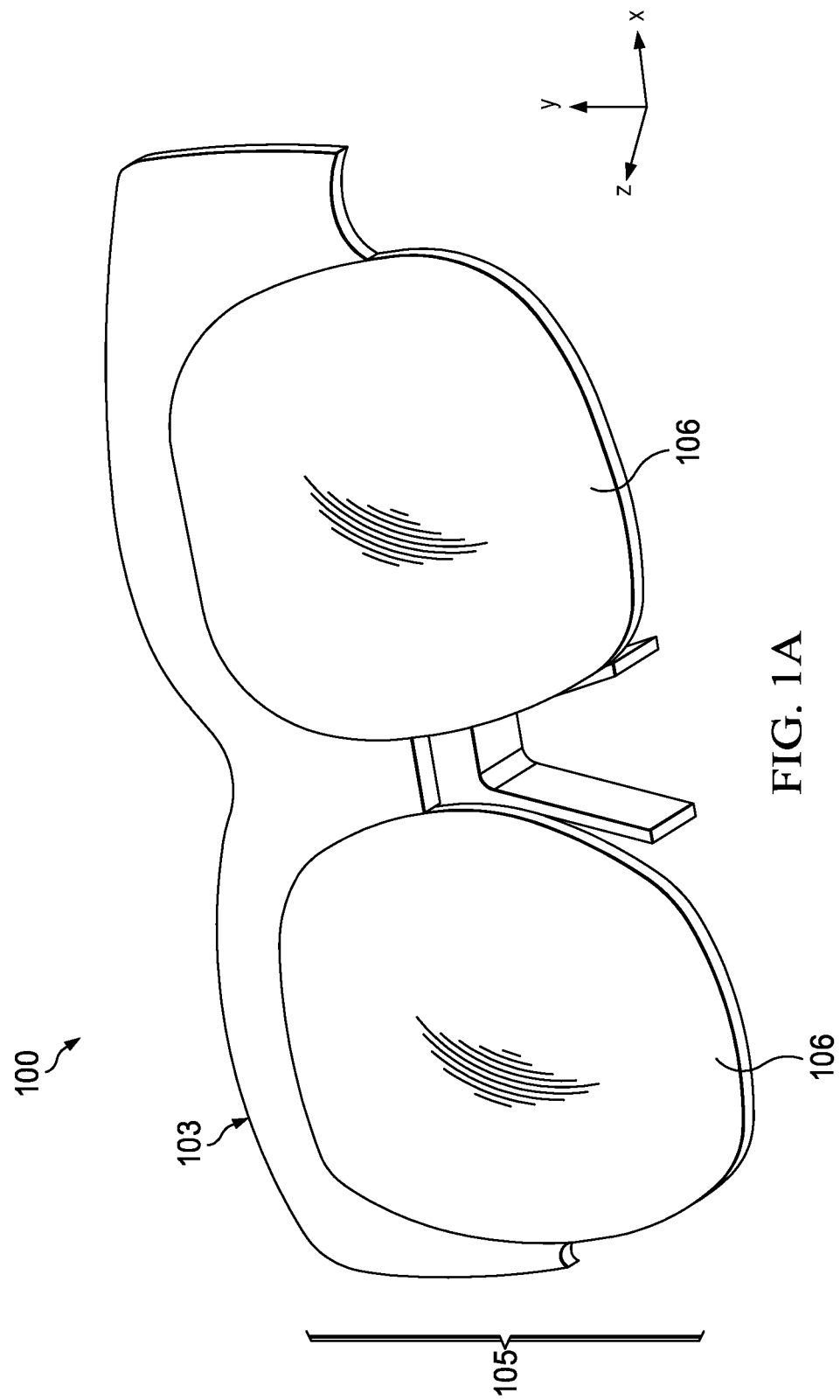
FIG. 1A is a diagram illustrating an exterior portion of an NED according to various embodiments of the disclosure.
Figure 1B:
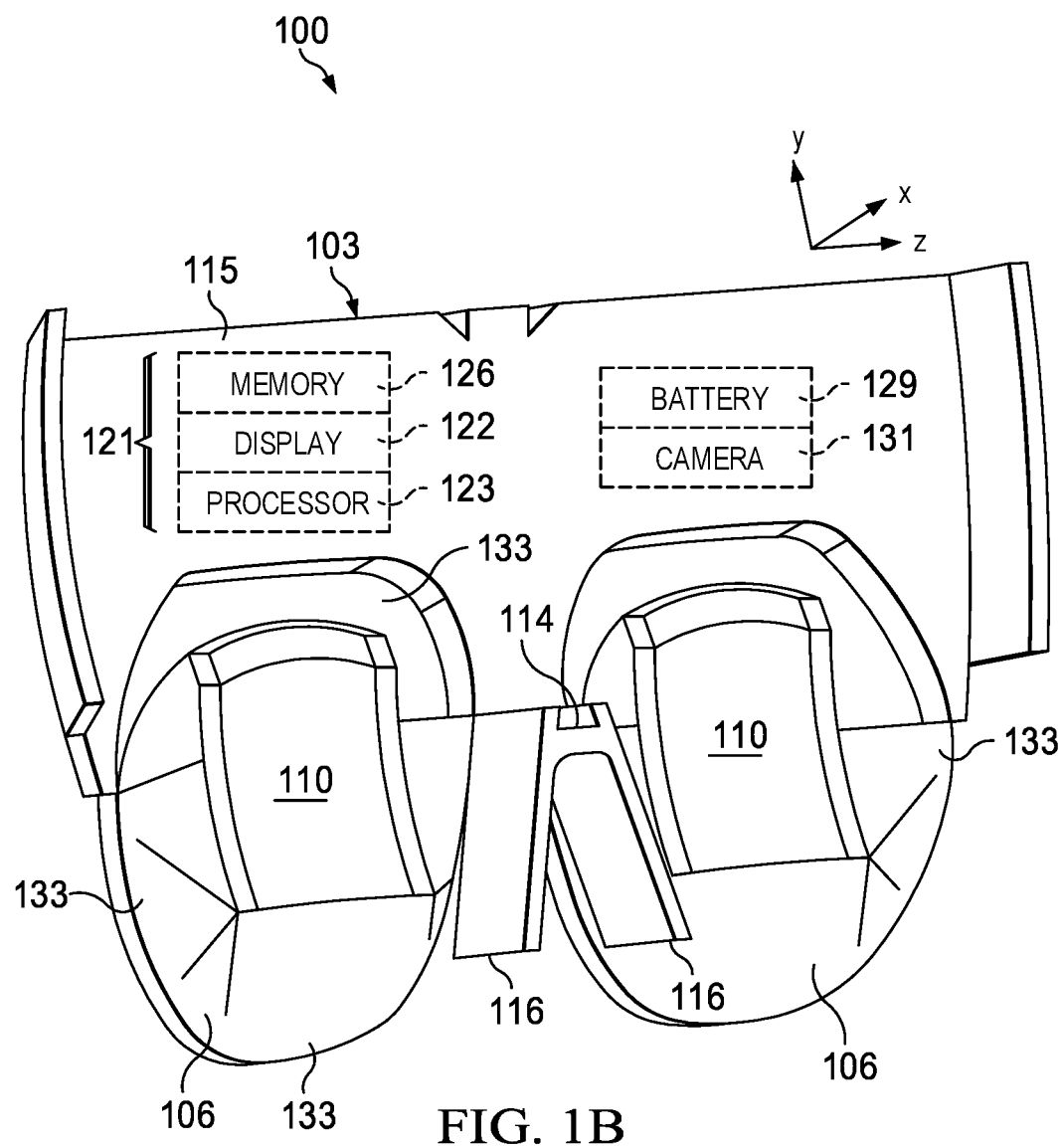
FIG. 1B is a diagram illustrating an interior portion of the NED according to various embodiments of the disclosure.

FIGS. 1A-B are diagrams illustrating the exterior and interior portions of an NED 100 according to various embodiments of the disclosure. In particular, FIG. 1A is a diagram illustrating an exterior surface of a portion of the NED 100 facing the external environment, and FIG. 1B is a diagram illustrating an interior portion of the NED 100 facing the user wearing the NED 100.

The portion of the NED 100 shown in FIG. 1A includes a frame 103, a visor 105, and outer lenses 106. As should be appreciated, there are other components of the NED 100, such as the temples, hinges, etc., that are not otherwise shown in FIG. 1A.

The visor 105 includes the portion of the NED 100 shown in FIG. 1, with the frame 103 and the outer lenses 106. The frame 103 includes various components that secure the NED 100 to a user's head. In an embodiment, the frame 103 also provides structural support for the various components of the NED 100, such as the two outer lenses 106. As will be further discussed below with reference to FIGS. 3A-D and FIGS. 6A-D, the outer lenses 106 may be integrated with AR lenses of the NED 100. In an embodiment, the two outer lenses 106 are molded using plastic injection molding and glued onto the frame 103. In an embodiment, the two outer lenses 106 are inserted and held in place with the frame 103 using eye wires that extend around each outer lens 106.

In an embodiment, an exterior of the outer lenses 106 is made of transparent, partially transparent, or tinted material, such as, for example, a partially transparent plastic material and/or a polycarbonate material. Additional details regarding the composition of the outer lenses 106 will be further described below with regard to FIGS. 3A-D-8A-C.

In some embodiments, a user wearing the NED 100 may see through the outer lenses 106 to view an external environment surrounding the user and/or light from the external environment. As will be further described below with reference to FIG. 1B, NED 100 further includes two AR lenses positioned on the interior (e.g., closer to the user's eye) of the NED 100, in which the AR lenses superimpose images generated by the NED 100 with the external environment surrounding the user.

FIG. 1B is a diagram illustrating an interior portion of the NED 100 shown in FIG. 1A according to various embodiments of the disclosure. As shown in FIG. 1B, NED 100 additionally includes two AR lenses 110, and frame 103 additionally includes a connecting bridge 114, and a holder 115. Each AR lens 110 is an optical glass, which allows images to reflect or refract within. In an embodiment, each AR lens 110 is a freeform optical lens, which is further described below with reference to FIGS. 2A-C. The connecting bridge 114 is an arched piece in the center of the frame 103 that includes two nose pads 116, which rest on the user's nose when the user wears the NED 100.

The holder 115 supports one or more component parts of the NED 100, such as, for example, a battery 129, a camera 131, and/or a micro-display panel 121. In an embodiment, a micro-display panel 121 is a panel that may include a display 122, a processor 123, and/or a memory 126. It should be appreciated that the NED 100 may include other components not explicitly shown in FIG. 1B, each of which may be part of the micro-display panel 121 and/or supported by the holder 115.

The display 122 of the micro-display panel 121 is an emissive micro-display, such as an organic light-emitting diode (LED) (OLED), a micro light-emitting diode (μLED), a liquid crystal on silicon (LCOS) display, a digital light processing (DLP) display, or another display that generates images and projects the images into the AR lenses 110. The processor 123 may be a central processor unit (CPU), including one or more multi-core processors and be coupled to the memory 126. In an embodiment, the processor 123 is configured to generate images, frames, or videos that are passed through the AR lenses 110 and superimposed with the external environment or light from the external environment. In some cases, the micro-display panel 121 may refer to both the display 122 and the processor 123. The memory 126 may be a cache for temporarily storing content, e.g., a random access memory (RAM). The memory 126 may also include a long-term storage for storing content relatively longer, e.g., a read-only memory (ROM). In an embodiment, the memory 126 stores the content produced by the processor 123 or captured by the camera 131. The battery 129 may be the power source for the NED 100. In some cases, the temples may also be used to support and protect component parts of the NED 100.

The embodiments disclosed herein integrate particular lenses, which are typically found in the AR lens 110, into the outer lenses 106 to make efficient use of the outer lenses 106 and to make the NED 100 more aesthetically appealing. As shown by FIG. 1B, the AR lenses 110 are positioned inside of the outer lenses 106. As will be further described below with reference to FIGS. 3A-D and FIGS. 6A-D, the outer lens 106 may include a display corrector lens and/or a see-through corrector lens, while the AR lens 110 includes a main prism lens. For example, when the outer lens 106 includes the display corrector lens, the AR lens 110 includes the main prism lens and the see-through corrector lens. When the outer lens 106 includes the see-through corrector lens, the AR lens 110 includes the main prism lens and the display corrector lens.

In an embodiment, when the NED 100 is fully constructed, the AR lens 110 abuts against the outer lens 106. In an embodiment, when the NED 100 is fully constructed, the AR lens 110 is detachably coupled to the outer lens 106. For example, the AR lens 110 may be attached to the frame 103 and then positioned and secured up against an interior of the outer lens 106 upon construction of the NED 100.

As shown in FIGS. 1B and 1n an embodiment, the outer lens 106 may include edges 133. In an embodiment, the edges 133 are made of plastic or polycarbonate material. In an embodiment, the edges 133 taper or slope down from the edges of a prism lens within the AR lens 110 to the edges of the outer lens 106. The edges 133 may also support one or more prisms within the AR lens 110 to the outer lens 106.

Figure 2C:
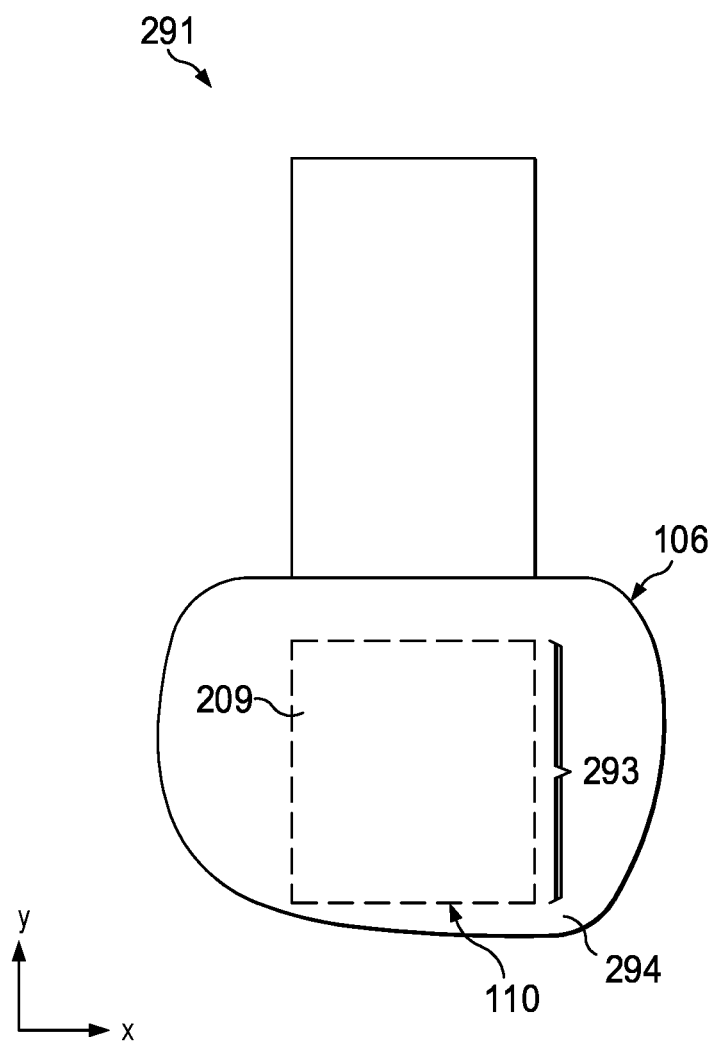
FIG. 2C is a diagram illustrating a front view of the AR lens integrated with an outer lens of the visor according to various embodiments of the disclosure.

Referring now to FIGS. 2A-C, shown are diagrams illustrating the prism lenses and different areas within an AR lens 110 implemented as a freeform optical lens according to various embodiments of the disclosure. In particular, FIG. 2A is a diagram illustrating a side view of the various prisms within an AR lens 110, FIG. 2B is a ray diagram illustrating a display path and a see-through path within the prisms of the AR lens 110, and FIG. 2C is a diagram illustrating a front view of an AR lens 110 integrated with an outer lens 106 according to various embodiments of the disclosure.

Referring now to FIG. 2A, shown is a diagram illustrating a side view of an AR lens 110. The AR lens 110 of FIG. 2A includes a display corrector lens 203, a main prism lens 206, and a see-through corrector lens 209. The display corrector lens 203, the main prism lens 206, and the see-through corrector lens 209 may be freeform prisms. Freeform prisms are prisms that comprise at least one freeform surface. A freeform surface is a surface that has no translational symmetry or rotational symmetry about axes normal to a mean plane. Freeform prisms provide a relatively smaller size, a relatively simpler manufacturing process, and relatively better performance characteristics compared to non-freeform prisms.

The display corrector lens 203, the main prism lens 206, and the see-through corrector lens 209 are low-dispersion lenses comprising polymethyl methacrylate (PMMA) materials or high-dispersion lenses comprising polycarbonate (PC) materials. Low-dispersion lenses have at least one positively-powered surface to converge optical waves. High-dispersion lenses have at least one negatively-powered surface to diverge optical waves.

The display corrector lens 203 provides the first optical fold of the AR lens 110 and the degrees of freedom for aberration correction and display quality improvement. The main prism lens 206 provides the second and third optical fold. The main prism lens 206 is a generally wedge-shaped lens. Together, the display corrector lens 203 and the main prism lens 206 act as a doublet to reduce chromatic aberration of images. For that purpose, either the display corrector lens 203 or the main prism lens 206 is a low-dispersion lens while the other is a high-dispersion lens.

The see-through corrector lens 209 corrects the distortion from the main prism lens 206 in a see-through path between the user's eyes and the external environment the user is viewing, and helps to form an undistorted view of the external environment. The see-through corrector lens 209 maintains a non-distorted natural FOV and counteracts distortions from the main prism lens 206 due to ambient light passing from the see-through corrector lens 209 and through the main prism lens 206. For that purpose, the main prism lens 206 and the see-through corrector lens 209 are either both low-dispersion lenses or high-dispersion lenses.

Referring now to FIG. 2B, shown is a ray diagram 210 illustrating a display path (in dashed lines) that content would take through, for example, the AR lens 110 of FIG. 2A. The ray diagram 210 shows a micro-display panel 121. As will be more fully explained below, the ray diagram 210 also depicts various surfaces of the display corrector lens 203, the main prism lens 206, and the see-through corrector lens 209 from the AR lens 110 in FIG. 2A.

The ray diagram 210 of FIG. 2B depicts first surface 220, a second surface 230, and a third surface 240 that correspond to the shape of the display corrector lens 203 of FIG. 2A. The first surface 220 comprises an AR coating, refracts images, is angled at about 60° with respect to the y-axis, and has an angle of incidence (AOI) of about 0°-57.1°. The second surface 230 comprises a mirror coating, reflects the images, is angled at about −2° with respect to the y-axis, and has an AOI of about 39°-59°. A negative angle is measured in a counterclockwise direction, while a positive angle is measured in a clockwise direction. Thus, −2° is equivalent to 358°. The third surface 240 is uncoated, refracts the images, comprises a center line angled at about −45° with respect to the y-axis, and is positively powered. The third surface 240 faces the main prism lens 206.

As shown by the ray diagram 210 of FIG. 2B, the fourth surface 250, the fifth surface 260, and the sixth surface 270 correspond to the shape of the main prism lens 206 of FIG. 2A. The fourth surface 250 is uncoated, refracts the images, is angled at about −45° with respect to the y-axis, has an AOI of about 0°-44.4°, and is negatively powered. The fourth surface 250 faces the display corrector lens 203. The fifth surface 260 comprises an AR coating, refracts and reflects the images, is angled at about 3° with respect to the y-axis, and has an AOI of about 0°-21.2° for refraction and about 47.45°-59.63° for reflection. The sixth surface 270 comprises a beam splitter (BS) coating, reflects the images, is angled at about 27° with respect to the y-axis, and has an AOI of about 22°-35.8°.

The seventh surface 280 and the eighth surface 290 of the ray diagram 210 in FIG. 2B correspond to the shape of the see-through corrector lens 209 of FIG. 2A. The seventh surface 280 is uncoated, refracts the images, and is angled at about 27° with respect to the y-axis. The eighth surface 290 comprises an AR coating, refracts the images, is angled at about 0° with respect to the y-axis, and has an AOI of about 0°-18.53°.

In an embodiment, the third surface 240 of the display corrector lens 203 abuts, or faces up against, the fourth surface 250 of the main prism lens 206. For example, the third surface 240 of the display corrector lens 203 may be bonded to the fourth surface 250 of the main prism lens 206 using glue.

In operation, the micro-display panel 121 generates an image and projects the image into the display corrector lens 203. Though a single ray represents the image, the image is a combination of optical waves at different wavelengths.

The image refracts through the first surface 220, reflects off of the second surface 230, and refracts through the third surface 240 and the fourth surface 250 to enter the main prism lens 206. Then, the image reflects off of the fifth surface 260, reflects off of the sixth surface 270, refracts through the fifth surface 260, and enters a user's eye. Meanwhile, the user's FOV refracts through the eighth surface 290, the seventh surface 280, the sixth surface 270, and the fifth surface 260, to then enter the user's eye.

Additional details regarding the structure and display path of the AR lens 110, implemented as a freeform lens, is further described in U.S. Patent Pub. No. 2012/0081800 and U.S. Pat. App. No. 62/789,728.

Referring now to FIG. 2C, shown is a diagram illustrating a front view 291 of an AR lens 110 and outer lens 106 construction according to various embodiments of the disclosure. The AR lens 110 coupled with the outer lens 106 may include a see-through optical area 293. The see-through optical area 293 is a portion of the AR lens 110 with the outer lens 106 that the user wearing the NED 100 sees through to view both the external environment surrounding the user and the image or content generated and displayed by the micro-display panel 121. In an embodiment, the see-through optical area 293 includes a portion of the main prism lens 206 (not shown), and the see-through corrector lens 209.

As shown by the front view 291 of the AR lens 110, a non-optical layer 294 of the outer lens 106 at least partially surrounds the optical area 293 of the AR lens 110. The non-optical layer 294 is a layer of transparent or partially transparent material that does not include any of the prisms or folds that are included in the AR lens 110, as described with reference to FIGS. 2A-B.

Figure 3A:
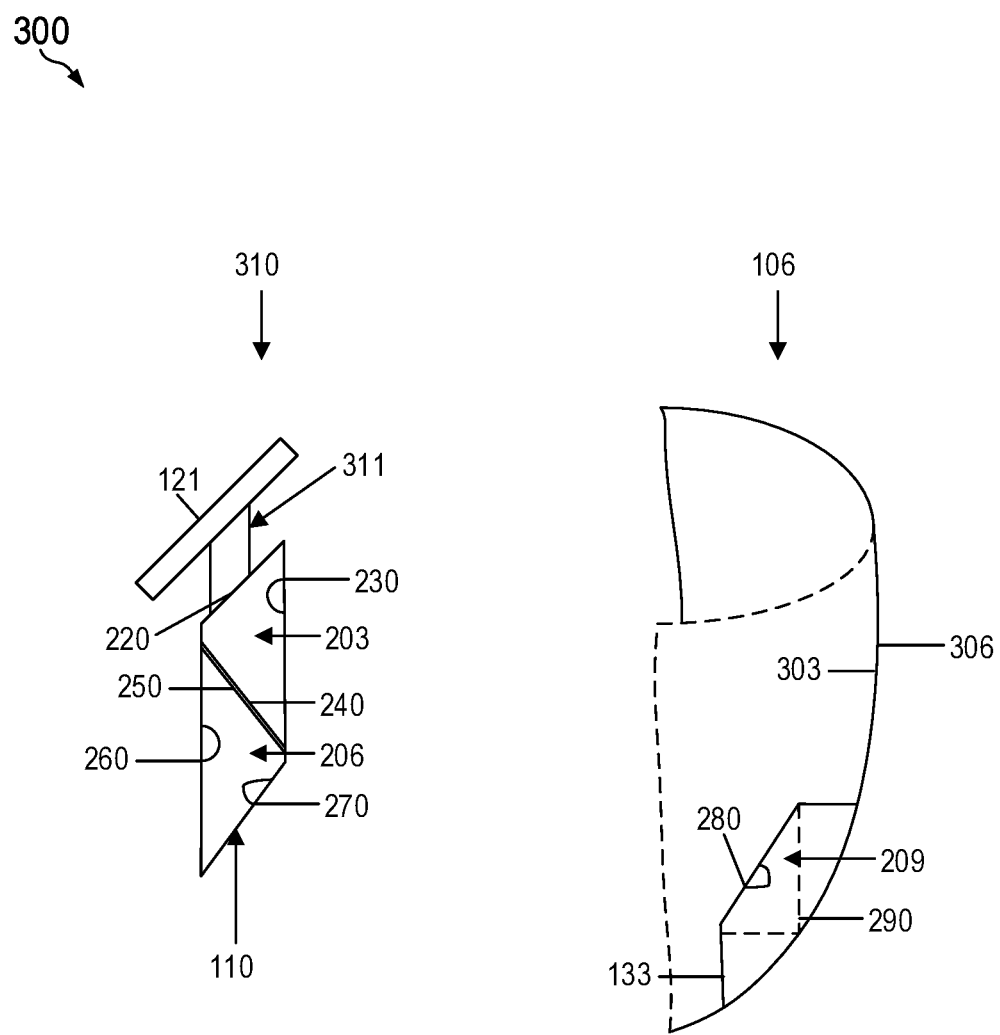
FIGS. 3A-D are diagrams illustrating various examples of integrating the display corrector lens and/or the see-through corrector lens with the outer lens according to various embodiments of the disclosure.
Figure 3B:
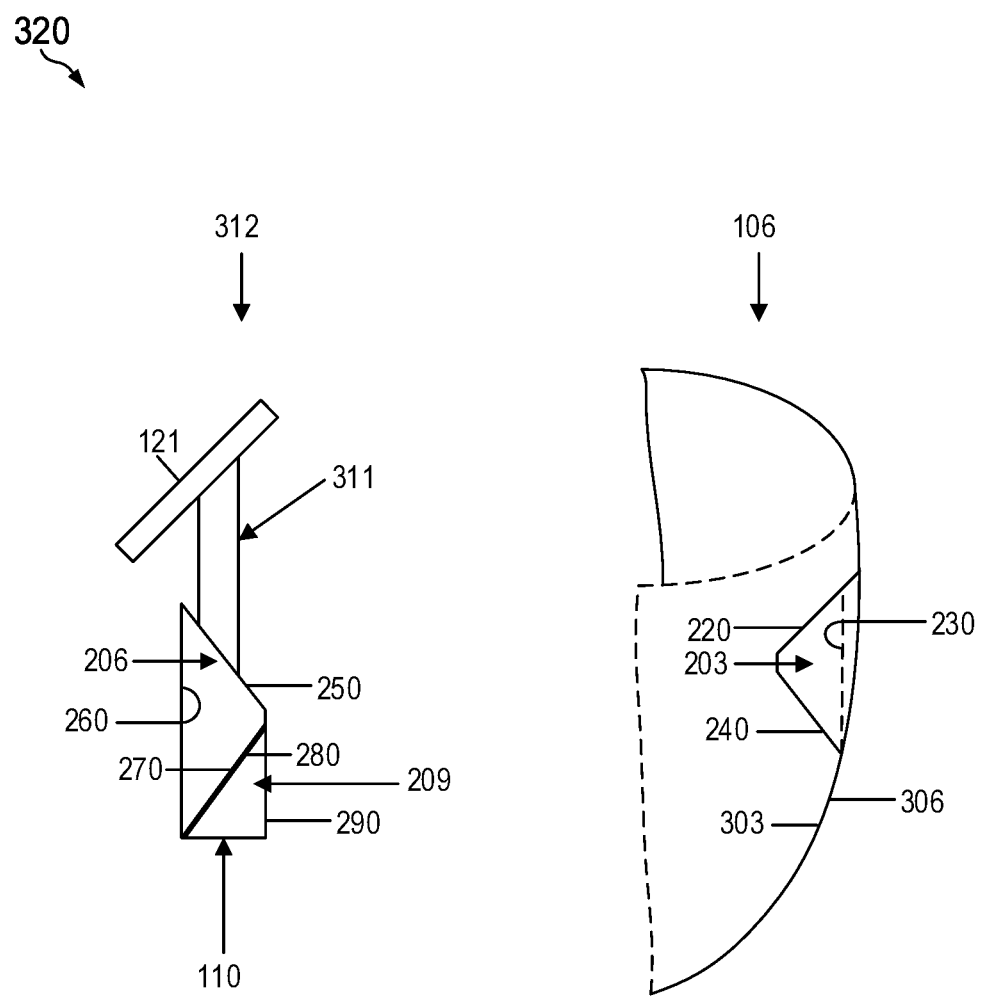
Figure 3C:
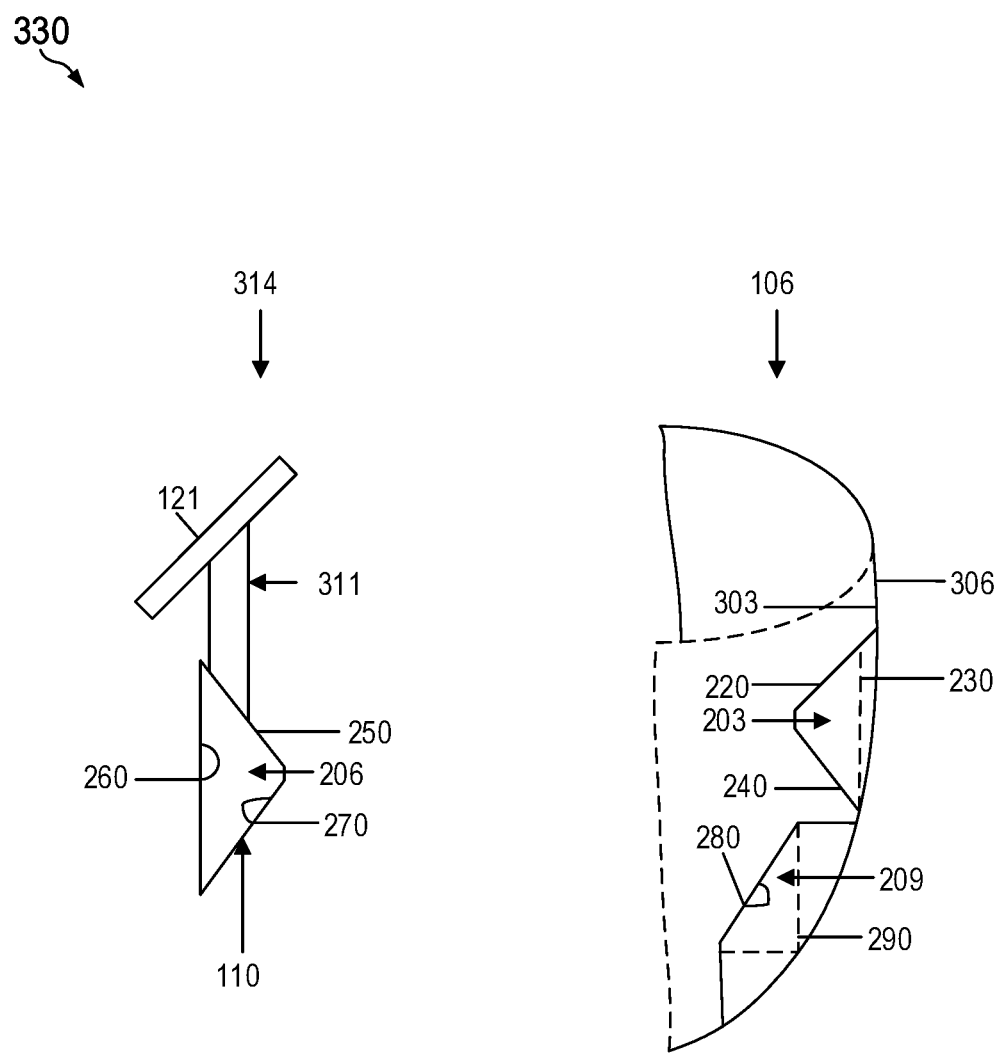
Figure 3D:
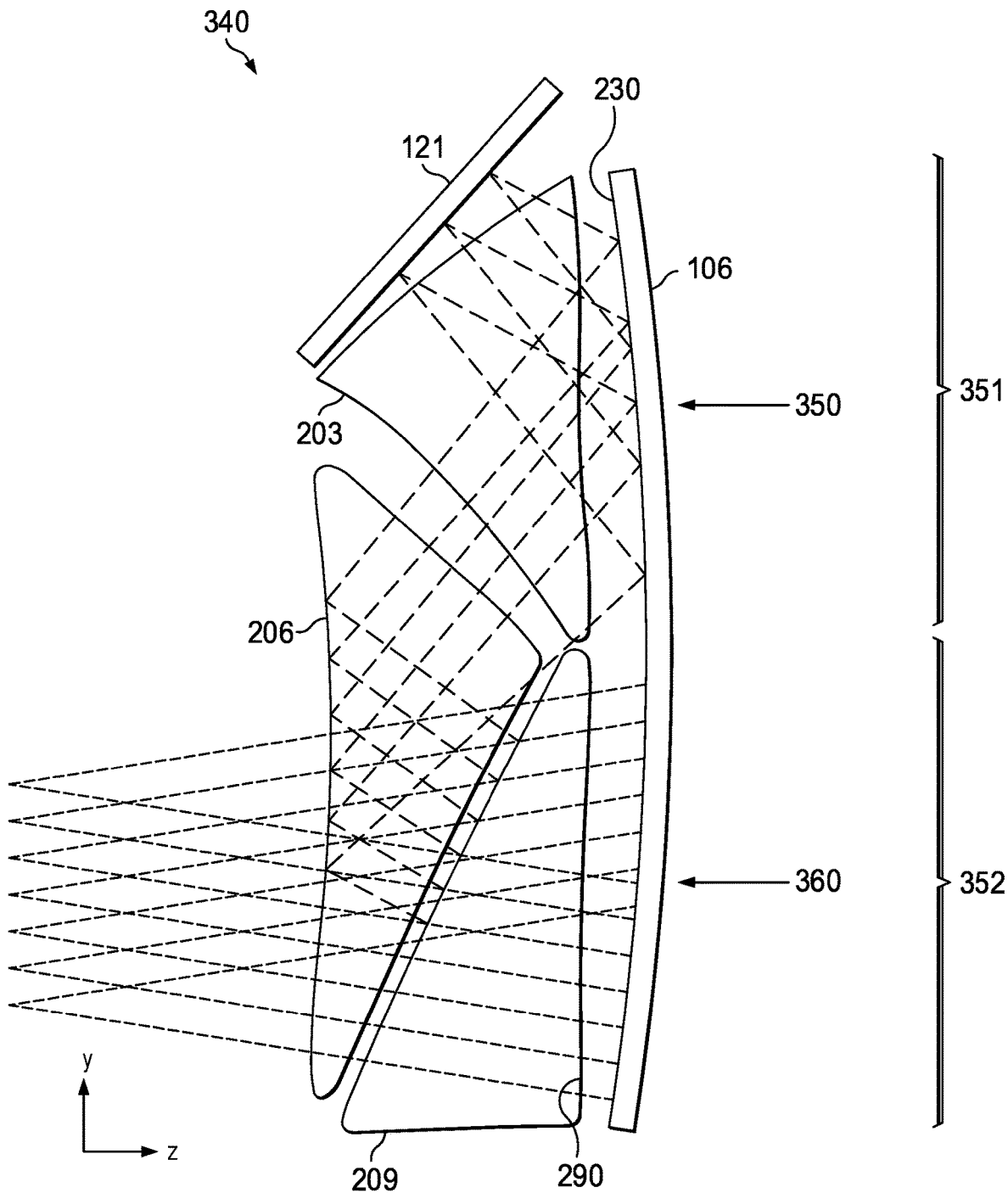

Referring now to FIGS. 3A-D, shown are diagrams illustrating the integration of the display corrector lens 203 and/or the see-through corrector lens 209 with the outer lens 106 according to various embodiments of the disclosure. In particular, FIG. 3A is a diagram illustrating an integration of the see-through corrector lens 209 with the outer lens 106, FIG. 3B is a diagram illustrating an integration of the display corrector lens 203 with the outer lens 106, FIG. 3C is a diagram illustrating an integration of both the display corrector lens 203 and the see-through corrector lens 209 with the outer lens 106, and FIG. 3D is a ray diagram illustrating a display path within the AR lens 110 integrated with the outer lens 106.

Referring now to FIG. 3A, shown is a diagram of an integrated lens 300 including both the AR lens 110 construction 310 and the outer lens 106 according to various embodiments of the disclosure. In particular, FIG. 3A illustrates that the outer lens 106 includes the see-through corrector lens 209.

The AR lens 110 construction 310 includes the micro-display panel 121 and the AR lens 110, which in the embodiment shown in FIG. 3A, includes the display corrector lens 203 and the main prism lens 206. In the AR lens 110 construction 310 of FIG. 3A, the micro-display panel 121 is interconnected with the AR lens 110 by the joint 311. The joint 311 is a supporting structure designed to provide support and secure the AR lens 110 to the micro-display panel 121 and the frame 103 (not shown).

In an embodiment, AR lens 110 may be coupled, or attached to, the joint 311 using glue, or any other type of screwing or fastening process that can attach plastic or polycarbonate materials together. Similarly, the micro-display panel 121 may be coupled, or attached to, the joint 311 using glue, or any other type of screwing or fastening process that can attach plastic or polycarbonate materials together. Within the AR lens 110, the display corrector lens 203 and the main prism lens 206 may be coupled, or attached together, using glue, or any other type of bonding or fastening process that can attach plastic or polycarbonate materials together.

As described above with reference to the ray diagram 210 of FIG. 2B, the display corrector lens 203 includes the first surface 220, the second surface 230, and the third surface 240. The main prism lens 206 includes the fourth surface 250, the fifth surface 260, and the sixth surface 270.

In the embodiment of the integrated lens 300 shown in FIG. 3A, the outer lens 106 comprises an interior surface 303, an exterior surface 306, the see-through corrector lens 209, and an edge 133. The interior surface 303 is the surface of the outer lens 106 facing the user, and the exterior surface 306 is the surface of the outer lens 106 facing the exterior environment. The edge 133 may be an edge of the see-through corrector lens 209 that extends downwards along the Y axis toward a bottom edge of the outer lens 106.

As described above with reference to the ray diagram 210 of FIG. 2B, the see-through corrector lens 209 includes the seventh surface 280 and the eighth surface 290. In the integrated lens 300 of FIG. 3A, the seventh surface 280 and the interior surface 303 are on the same side of the outer lens 106.

The see-through corrector lens 209 may be integrated with the outer lens 106 in various manners. In a first embodiment, the see-through corrector lens 209 may be formed as part of the outer lens 106. In this embodiment, the seventh surface 280 and the interior surface 303 are on the same side of the outer lens 106, and the eighth surface 290 of the see-through corrector lens 209 is part of the exterior surface 306 of, or embedded within, the outer lens 106. In a second embodiment, the see-through corrector lens 209 is detachably coupled to the interior surface 303 of the outer lens 106. In this embodiment, a portion of the eighth surface 290 of the see-through corrector lens 209 abuts the interior surface 303 of the outer lens 106. In an embodiment, the see-through corrector lens 209 and the outer lens 106 are coupled together in a manner that leaves an air gap between the see-through corrector lens 209 and the outer lens 106. By integrating the see-through corrector lens 209 into the outer lens 106, the interior surface 303 of the outer lens 106 is modified to include surfaces of the see-through corrector lens 209 and the edge 133. When constructing the NED 100 with the embodiment of the AR lens 110 construction 310 and the outer lens 106 shown in FIG. 3A, the AR lens 110 construction 310 may be coupled to the outer lens 106 such that the sixth surface 270 of the main prism lens 206 is drawn toward the seventh surface 280 of the see-through corrector lens 209 until the main prism lens 206 abuts the see-through corrector lens 209.

Referring now to FIG. 3B, shown is a diagram of an integrated lens 320 including both the AR lens 110 construction 312 and the outer lens 106 according to various embodiments of the disclosure. The integrated lens 320 shown in FIG. 3B is similar to the integrated lens 300 shown in FIG. 3A, except that the integrated lens 320 illustrates that the outer lens 106 includes the display corrector lens 203. In addition, the AR lens 110 included in the AR lens 110 construction 312 includes the main prism lens 206 and the see-through corrector lens 209.

The AR lens 110 construction 312 includes the micro-display panel 121 and the AR lens 110. Similar to the AR lens 110 construction 310 described above with reference to FIG. 3A, the AR lens 110 construction 312 shown in FIG. 3B also includes the micro-display panel 121 interconnected with the AR lens 110 by the joint 311.

As described above with reference to FIG. 2B, the main prism lens 206 includes the fourth surface 250, the fifth surface 260, and the sixth surface 270. The see-through corrector lens 209 includes the seventh surface 280 and the eighth surface 290. Within the AR lens 110 of the AR lens 110 construction 312 shown in FIG. 3B, the main prism lens 206 and the see-through corrector lens 209 are coupled, or attached together, using glue, or any other type of bonding or fastening process that can attach plastic or polycarbonate materials together.

Similar to the outer lens 106 defined above with reference to FIG. 3A, the outer lens 106 shown in FIG. 3B comprises an interior surface 303 and an exterior surface 306. Unlike the outer lens 106 defined above with reference to FIG. 3A, the outer lens 106 shown in FIG. 3B comprises the display corrector lens 203 (instead of the see-through corrector lens 209).

As described above with reference to the ray diagram 210 of FIG. 2B, the display corrector lens 203 includes the first surface 220, the second surface 230, and the third surface 240. In the embodiment of the integrated lens 320 shown in FIG. 3B, first surface 220 and the third surface 240 of the display corrector lens 203 are on the same side of the outer lens 106 as the interior surface 303.

The display corrector lens 203 may be integrated with the outer lens 106 is various manners. In a first embodiment, the display corrector lens 203 may be formed as part of the outer lens 106. In this embodiment, the first surface 220, the third surface 240, and the interior surface 303 are on the same side of the outer lens 106. The second surface 230 of the outer lens 106 is part of the exterior surface 306 of, or embedded within, the outer lens 106. In a second embodiment, the display corrector lens 203 is detachably coupled to the interior surface 303 of the outer lens 106. In this embodiment, the first surface 220, the third surface 240, and the interior surface 303 are on the same side of the outer lens 106. In an embodiment, a portion of the second surface 230 of the display corrector lens 203 abuts the interior surface 303 of the outer lens 106. In an embodiment, the display corrector lens 203 and the outer lens 106 are coupled together in a manner that leaves an air gap between the display corrector lens 203 and the outer lens 106. By integrating the display corrector lens 203 into the outer lens 106, the interior surface 303 of the outer lens 106 is modified to include surfaces of the display corrector lens 203. When constructing the NED 100 with the embodiment of the AR lens 110 construction 312 and the outer lens 106 shown in FIG. 3B, the AR lens 110 construction 312 may be coupled to the outer lens 106 such that the fourth surface 250 of the main prism lens 206 is drawn toward the third surface 240 of the display corrector lens 203 until the main prism lens 206 abuts the display corrector lens 203.

Referring now to FIG. 3C, shown is a diagram of an integrated lens 330 including both the AR lens 110 construction 314 and the outer lens 106 according to various embodiments of the disclosure. The integrated lens 330 shown in FIG. 3C is similar to the integrated lens 300 shown in FIG. 3A and the integrated lens 320 shown in FIG. 3B, except that the integrated lens 330 illustrates that the outer lens 106 includes both the display corrector lens 203 and the see-through corrector lens 209. In addition, the AR lens 110 included in the AR lens 110 construction 314 of the integrated lens 330 shown in FIG. 3C only includes the main prism lens 206. As described above with reference to FIG. 2B, the main prism lens 206 includes the fourth surface 250, the fifth surface 260, and the sixth surface 270.

The AR lens 110 construction 314 includes the micro-display panel 121 and the AR lens 110. Similar to the AR lens 110 construction 310 and 312 described above with reference to FIGS. 3A-B, the AR lens 110 construction 314 shown in FIG. 3C also includes the micro-display panel 121 interconnected with the AR lens 110 by the joint 311.

Similar to the outer lenses 106 defined above with reference to FIGS. 3A-B, the outer lens 106 comprises an interior surface 303 and an exterior surface 306. Unlike the outer lenses 106 defined above with reference to FIGS. 3A-B, the outer lens 106 shown in FIG. 3C comprises both the display corrector lens 203 and the see-through corrector lens 209 (instead of just the display corrector lens 203 or the see-through corrector lens 209). As described above with reference to the ray diagram 210 of FIG. 2B, the display corrector lens 203 includes the first surface 220, the second surface 230, and the third surface 240. In addition, the see-through corrector lens 209 includes the seventh surface 280 and the eighth surface 290.

In the embodiment of the outer lens 106 shown by FIG. 3C, both the display corrector lens 203 and the see-through corrector lens 209 are part of the outer lens 106. In this embodiment, the first surface 220, the third surface 240, the seventh surface 280, and the interior surface 303 are on the same side of the outer lens 106. In this embodiment, the display corrector lens 203 is disposed above the see-through corrector lens 209.

The outer lens 106 is constructed to include the see-through corrector lens 209 in a manner similar to that which is described above with reference to FIG. 3A. The outer lens 106 is constructed to include the display corrector lens 203 in a manner similar to that which is described above with reference to FIG. 3B. When constructing the NED 100 with the embodiment of the AR lens 110 construction 314 and the outer lens 106 shown in FIG. 3C, the AR lens 110 construction 314 may be coupled to the outer lens 106 such that the fourth surface 250 of the main prism lens 206 is drawing toward the third surface 240 of the display corrector lens 203 and the sixth surface 270 of the main prism lens 206 is drawn toward the seventh surface 280 of the see-through corrector lens 209. In this way, the main prism lens 206 abuts the display corrector lens 203 and the see-through corrector lens 209.

As shown by FIGS. 3A-C, respectively, when the NED 100 is constructed to include the AR lens 110 and the outer lens 106 integrated together, the depth of the lens portion of the NED 100 is reduced greatly. By reducing the depth of the lens portion of the NED 100, the NED 100 more closely resembles the shape of a standard prescription eyeglass or standard sunglass, and thus, becomes more aesthetically appealing to a user or potential customer. Reducing the depth of the lens portion of the NED 100 may also reduce the amount of materials, and thus the cost, required to manufacture an NED 100.

FIGS. 3A-C describe various methods of integrating the AR lens 110 with the outer lens 106 to create integrated lens 300, 320, and 330. In an embodiment, the term "integrating" refers to forming the integrated lens 300, 320, and 330 from a monolithic segment including one or more of the prisms (e.g., display corrector lens 203, main prism lens 206, and see-through corrector lens 209) of the AR lens 110 and the outer lens 106 at a single time. In this embodiment, the monolithic segment may have always remained as a single piece that was never separated during formation of the integrated lens 300, 320, and 330. In this way, the integrated lenses 300, 320, and 330 are also formed from a single, monolithic segment including one or more of the prisms of the AR lens 110 and the outer lens 106 at a single time.

Referring now to FIG. 3D, shown is a ray diagram 340 illustrating a display path that content would take through, for example, the integrated lenses 300, 320, and 330 of FIGS. 3A-C. The ray diagram 340 is similar to the ray diagram 210 of FIG. 2B, except that the ray diagram 340 applies to the integrated lens 300, 320, and 330, in which the outer lens 106 includes the see-through corrector lens 209 and/or the display corrector lens 203.

As shown by FIG. 3D, the integration of the AR lens 110 and the outer lens 106 creates two optical areas 350 and 360. The non see-through optical area 350 includes the display corrector lens 203, a portion of the main prism lens 206, and a top portion 351 of the outer lens 106. The see-through optical area 360 includes another portion of the main prism lens 206, the see-through corrector lens 209, and a bottom portion 352 of the outer lens 106. In an embodiment, the see-through optical area 360 may be similar to the see-through optical area 293 described above with reference to FIG. 2C.

In operation, the micro-display panel 121 generates and outputs one or more images for display through the display corrector lens 203. As described above, the display corrector lens 203 includes the second surface 230, which may be part of the outer lens 106. In addition, as described above, see-through corrector lens 209 includes the eighth surface 290, which may part of the outer lens 106.

Figure 4B:
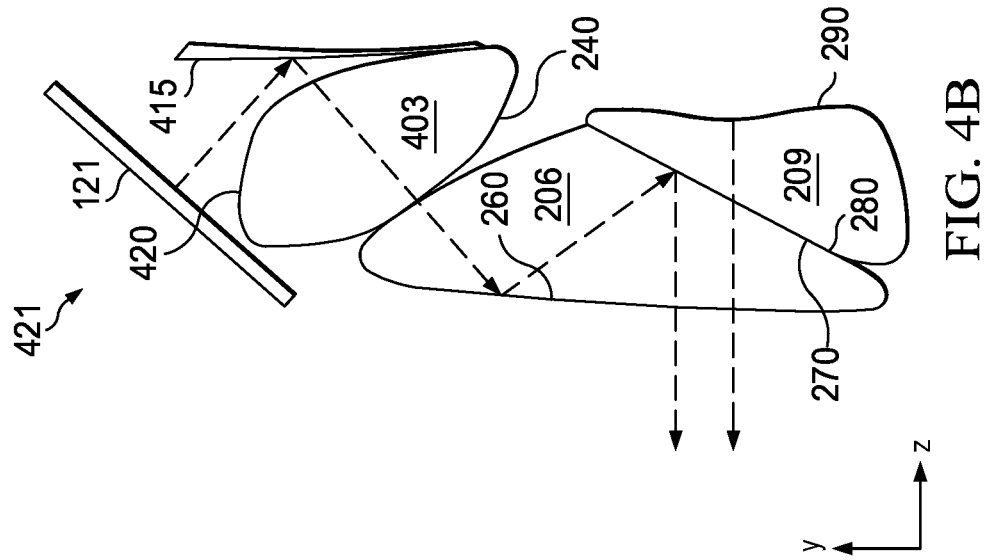
FIG. 4B is a ray diagram illustrating a display path within the prisms of the example AR lens shown in FIG. 4A according to various embodiments of the disclosure.
Figure 4A:
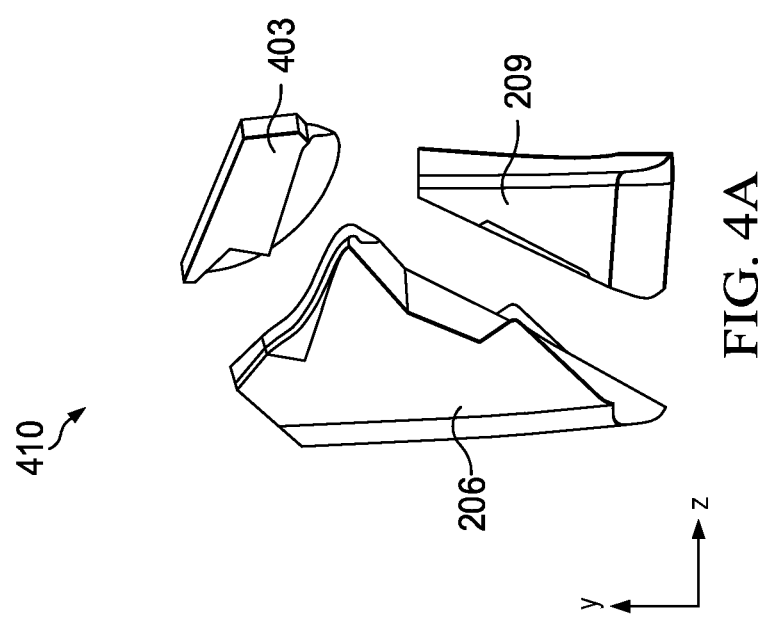
FIG. 4A is a diagram illustrating various prisms within another example AR lens of the NED according to various embodiments of the disclosure.

Referring now to FIGS. 4A-B, shown are diagrams illustrating prism lenses within an AR lens 410 and different areas within the AR lens 410 implemented as a freeform optical lens according to various embodiments of the disclosure. In particular, FIG. 4A is a diagram illustrating a side view of the various prisms within an AR lens 410 and FIG. 4B is a ray diagram illustrating a display path within the prisms of the AR lens 410.

FIGS. 4A-B describe an AR lens 410, which is similar to the AR lens 110, except that the AR lens 410 has a thinner or smaller display corrector lens 403 than the display corrector lens 203 described with reference to AR lens 110 described in FIGS. 2A-B.

Referring now to FIG. 4A, shown is a diagram illustrating a side view of an AR lens 410, which includes a display corrector lens 403, a main prism lens 206, and a see-through corrector lens 209. The main prism lens 206 and the see-through corrector lens 209 are substantially the same in function and shape as described above with reference to FIG. 2A.

However, the display corrector lens 403 is different from the display corrector lens 203 described above with reference to FIG. 2A in that the display corrector lens 403 is smaller, thinner, and has a different shape than display corrector lens 203. As will be further described below with reference to FIG. 4B, the display corrector lens 403 also includes fewer surfaces used to reflect and refract light and images from the micro-display panel 121 to the user.

Otherwise, the display corrector lens 403 is substantially similar to the display corrector lens 203 described above with reference to FIG. 2A. The display corrector lens 403 is still a freeform prism. In an embodiment, the display corrector lens 403 is either a low-dispersion lens comprising PMMA or a high-dispersion lens comprising PC materials, depending on whether the main prism lens 206 is a high-dispersion lens or a low-dispersion lens. The display corrector lens 403 operates with the main prism lens 206 to reduce chromatic aberration of images produced by material dispersion in the display path.

Referring now to FIG. 4B, shown is a ray diagram 421 illustrating a display path (in dashed lines) that content would take through, for example, the AR lens 410 of FIG. 4A. Similar to the ray diagram 210 shown in FIG. 2B, the ray diagram 421 shown in FIG. 4B shows a micro-display panel 121 and surfaces of the display corrector lens 403, the main prism lens 206, and the see-through corrector lens 209 of the AR lens 410 in FIG. 4A. Unlike the ray diagram 210 shown in FIG. 2B, the ray diagram 421 shown in FIG. 4B also shows the surfaces of the outer lens 106. In an embodiment and as will be further described below with reference to FIGS. 5A-D, the interior surface 303 of the outer lens 106 includes a mirror surface 415. In addition, the display corrector lens 403 shown in FIG. 4B is not a folding prism.

The ray diagram 421 of FIG. 4B depicts a first surface 420 and the third surface 240 that correspond to the shape of the display corrector lens 403. The first surface 420 comprises an AR coating, refracts images, is angled about −47° with respect to the y-axis, and has an AOI of about 0°-43°. The third surface 240 is similar to that which is described above with reference to FIG. 2B.

Notably, the display corrector lens 403 does not include the second surface 230 of the display corrector lens 203 of FIG. 2B. Instead, the outer lens 106 includes the mirror surface 415, which operates similar to the second surface 230 of the display corrector lens 203 of FIG. 2B. As shown by FIG. 4B, the mirror surface 415 is positioned on the outer lens 106 above the display corrector lens 403.

Unlike the display corrector lens 203, the display corrector lens 403 does not provide the first optical fold of the AR lens 410. Instead, the mirror surface 415 on the interior surface 303 of the outer lens 106 provides the first optical fold.

The main prism lens 206 and the see-through corrector lens 209 are substantially the same as those which are described above with reference to FIG. 2B. Similarly, surfaces of the main prism lens 206 and the see-through corrector lens 209 are substantially the same as those which are described above with reference to FIG. 2B.

In operation, the micro-display panel 121 generates an image and projects the image onto the mirror surface 415 of the outer lens 106. Though a single ray represents the image, the image is a combination of optical waves at different wavelengths. The image reflects off the mirror surface 415 of the outer lens 106 into the display corrector lens 403. The image refracts through the third surface 240 and the fourth surface 250, reflects off of the fifth surface 260, reflects off of the sixth surface 270, refracts through the fifth surface 260, and enters a user's eye. Meanwhile, the user's FOV refracts through the eighth surface 290, the seventh surface 280, the sixth surface 270, and the fifth surface 260, then enters the user's eye.

Figure 5:
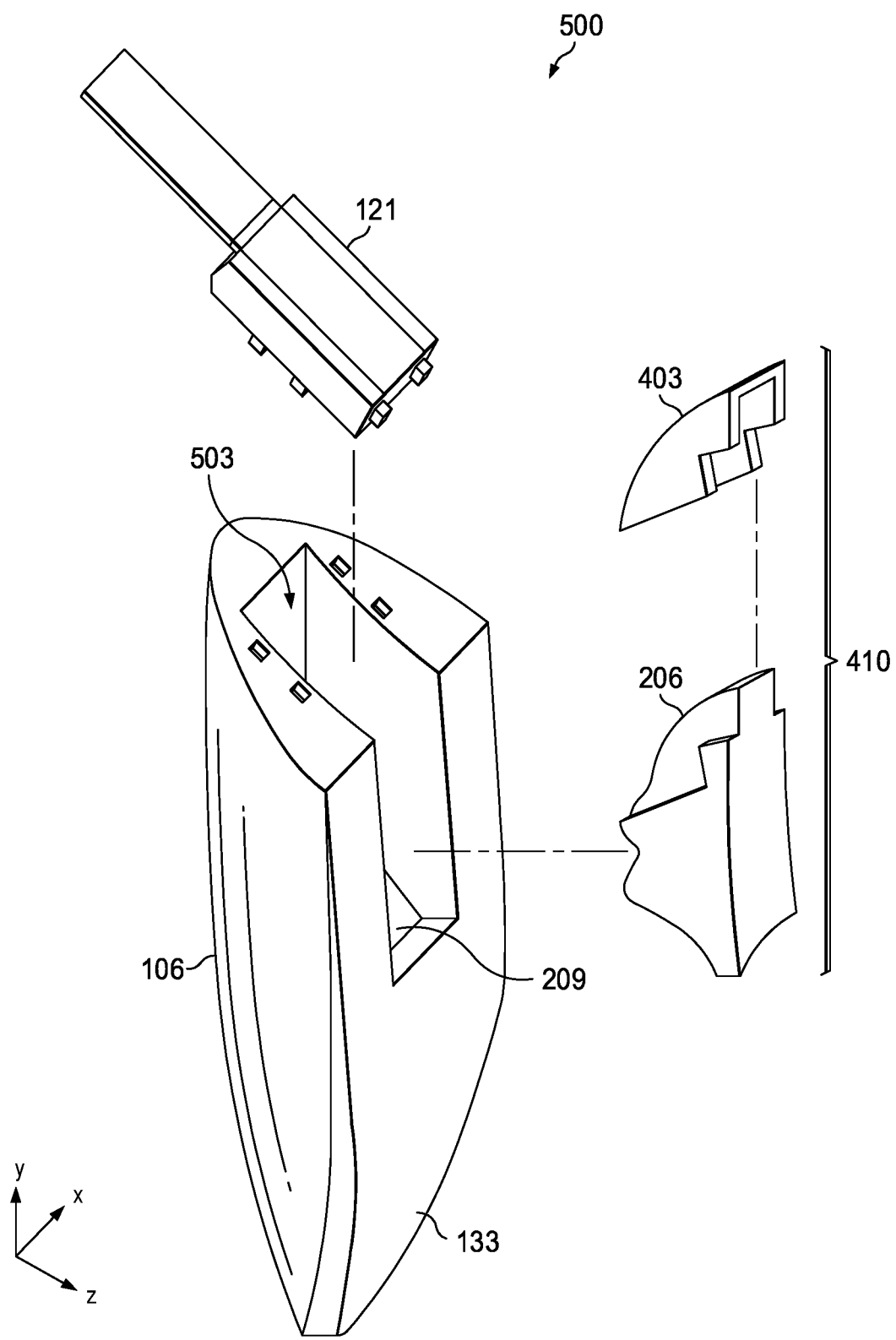
FIG. 5 is a diagram illustrating an AR lens construction and an outer lens according to various embodiments of the disclosure.

Referring now to FIG. 5, shown is a diagram 500 illustrating an AR lens 410 construction and an outer lens 106 including a see-through corrector lens 209 according to various embodiments of the disclosure. The AR lens 410 construction shown in FIG. 5 includes the micro-display panel 121, the display corrector lens 403, and the main prism lens 206. In the embodiment of the AR lens 410 construction of FIG. 5, the outer lens 106 includes the see-through corrector lens 209 and a recess 503.

In the embodiment shown in FIG. 5, the AR lens 410 includes the display corrector lens 403 and the main prism lens 206. In an embodiment, the AR lens 410 is formed by bonding the display corrector lens 403 and the main prism lens 206 together. In an embodiment, the outer lens 106 comprises the see-through corrector lens 209.

The recess 503 of the outer lens 106 is shaped for the mirror surface 415 and to receive and secure the main prism lens 206 and the display corrector lens 403 of AR lens 410 such that when the AR lens 410 is brought toward the recess 503, the recess 503 abuts the main prism lens 206. As shown by FIG. 5, the recess 503 includes a width with respect to the X-axis, a height with respect to the Y-axis, and a depth with respect to the Z-axis that is sufficient to hold and secure the main prism lens 206 and the display corrector lens 403 of the AR lens 410 within the recess 503. In this embodiment, the AR lens 410 may be secured within the recess 503 of the outer lens 106 with refractive index matching fluid between the main prism lens 206 and the display corrector 209. In this embodiment, the AR lens 110 is detachably coupled to the outer lens 106. In another embodiment, the AR lens 110 may be bonded to the outer lens 106 using, for example, glue.

In an embodiment, the outer lens 106 also includes the edge 133 that may slope or curve from a bottom edge of the recess 503 to a bottom edge of the outer lens 106. In an embodiment, the edge 133 may also slope or curve from the side edges of the recess 503 to the side edges of the outer lens 106.

Referring now to FIGS. 6A-D, shown are diagrams illustrating the integration of the display corrector lens 403 and/or the see-through corrector lens 209 with the outer lens 106 according to various embodiments of the disclosure. FIGS. 6A-D are similar to FIGS. 3A-D, except that the display corrector lens 403 is used instead of the display corrector lens 203, and the interior surface 303 of the outer lens 106 includes the mirror surface 415.

Figure 6A:
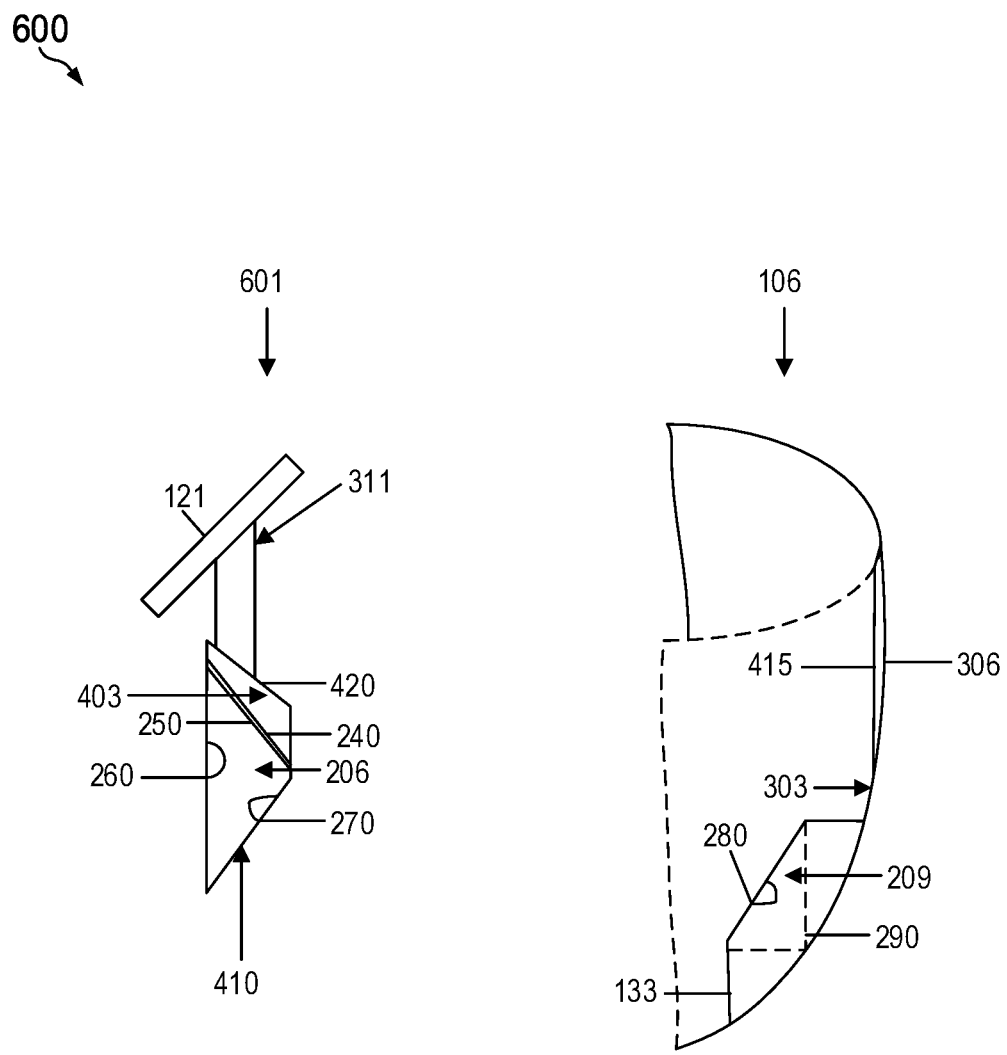
FIGS. 6A-D are diagrams illustrating various examples of integrating the display corrector lens and/or the see-through corrector lens with the outer lens according to various embodiments of the disclosure.
Figure 6B:
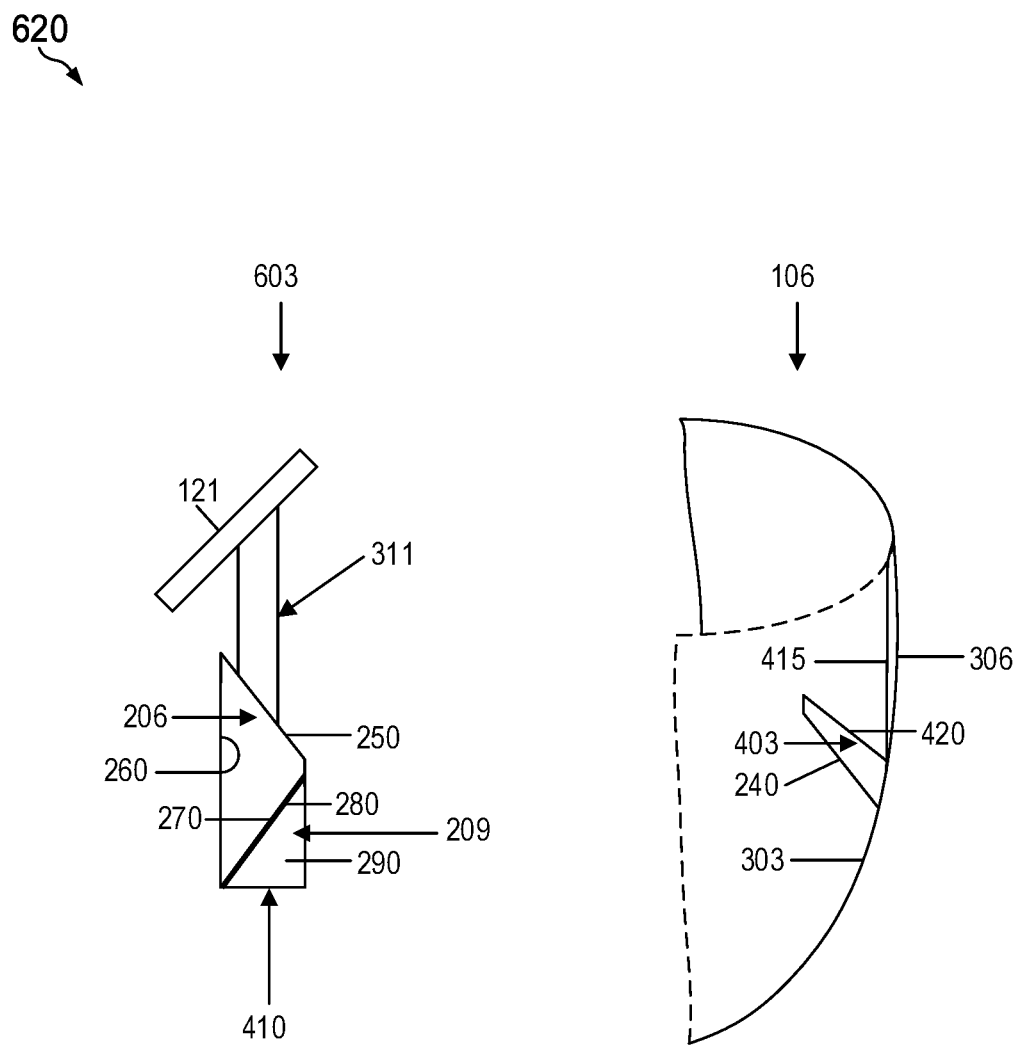
Figure 6C:
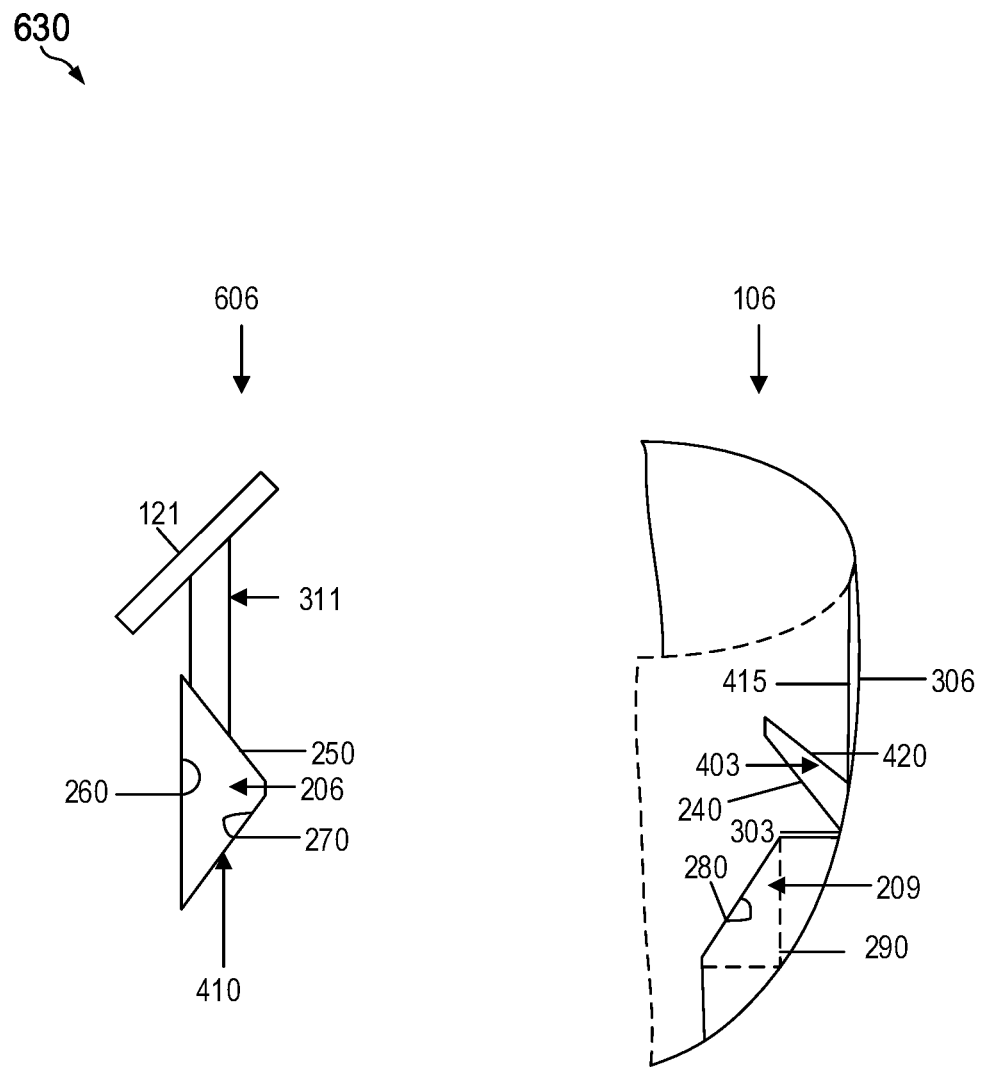
Figure 6D:
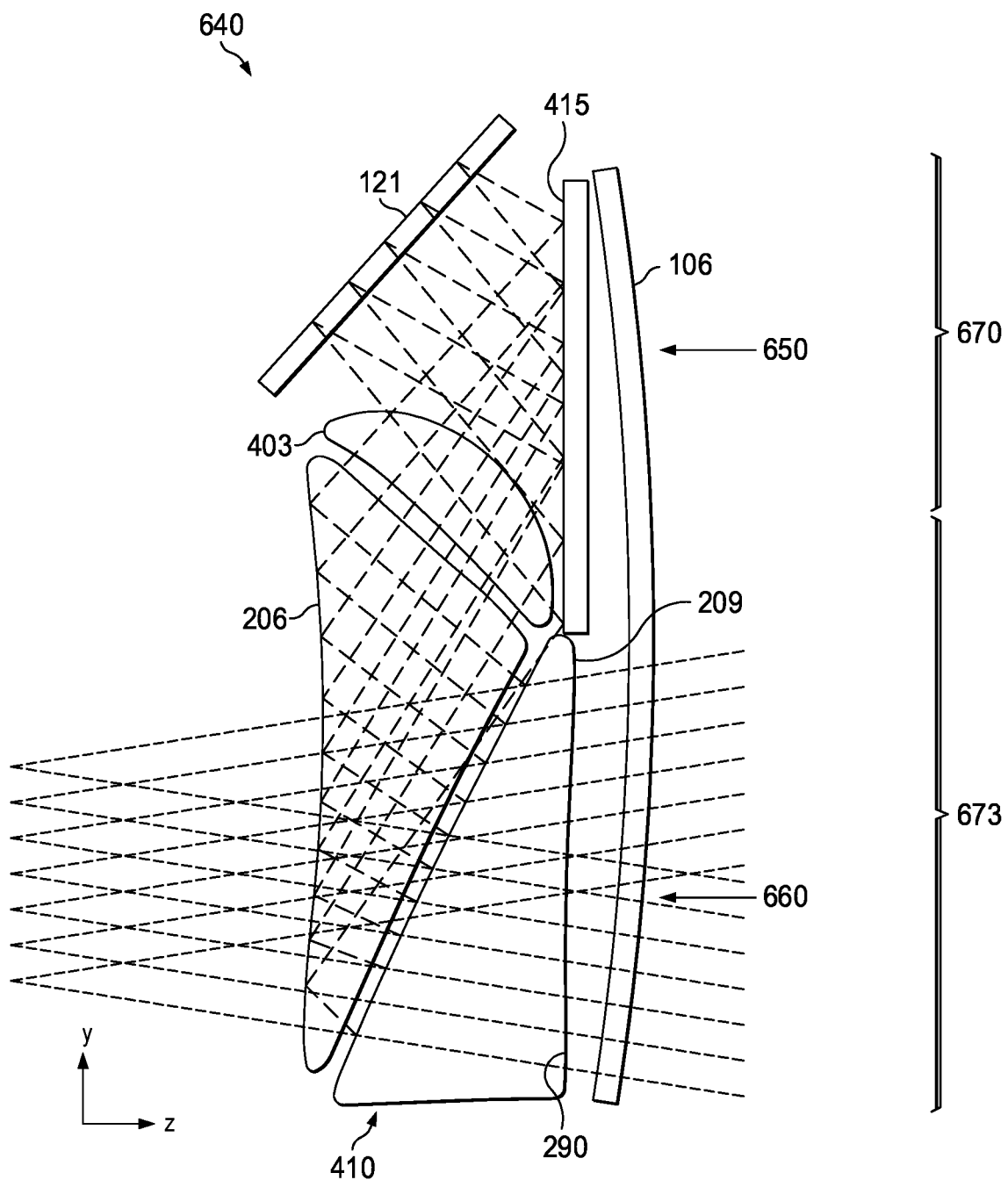

In particular, FIG. 6A is a diagram illustrating an integration of the see-through corrector lens 209 with the outer lens 106, FIG. 6B is a diagram illustrating an integration of the display corrector lens 403 with the outer lens 106, FIG. 6C is a diagram illustrating an integration of both the display corrector lens 403 and the see-through corrector lens 209 with the outer lens 106, and FIG. 6D is a ray diagram illustrating a display path within the AR lens 410 and the outer lens 106.

Referring now to FIG. 6A, shown is a diagram of an integrated lens 600 including both the AR lens 410 construction 601 and the outer lens 106 according to various embodiments of the disclosure. In particular, FIG. 6A illustrates how that the outer lens 106 includes the see-through corrector lens 209.

The integrated lens 600 is similar to the integrated lens 300, except that the AR lens 410 includes the display corrector lens 403 instead of the display corrector lens 203, and the interior surface 303 of the outer lens 106 includes mirror surface 415.

The AR lens 410 construction 601 includes the micro-display panel 121 and the AR lens 410, which in the embodiment shown in FIG. 6A, includes the display corrector lens 403 and the main prism lens 206. In the AR lens 410 construction 601, the micro-display panel 121 is interconnected with the AR lens 410 by the joint 311.

As described above with reference to the ray diagram 421 of FIG. 4B, the display corrector lens 403 includes the first surface 420 and the third surface 240. The main prism lens 206 includes the fourth surface 250, the fifth surface 260, and the sixth surface 270.

In the embodiment shown in FIG. 6A, the outer lens 106 comprises the interior surface 303, the exterior surface 306, the see-through corrector lens 209, and the edge 133, similar to the outer lens 106 of FIG. 3A. Unlike the outer lens 106 of FIG. 3A, the interior surface 303 includes a mirror surface 415 positioned above the see-through corrector lens 209.

Notably, the display corrector lens 403 no longer includes the second surface 230, which would have included a mirror coating. The mirror surface 415 essentially acts as the second surface 230 and is positioned in about the same location that second surface 230 would have been located had the display corrector lens 203 been used instead. In this embodiment, the mirror surface 415 includes a mirror, or reflective surface, that reflects the image projected by the micro-display panel 121. By including the mirror surface 415 as part of the outer lens 106, the interior surface 303 is modified to include the mirror surface 415. In addition, by using the mirror surface 415, the display corrector lens 403 does not need to include the second surface 230, and is thus, much thinner and/or smaller than the display corrector lens 203. Therefore, adding a mirror surface 415 to the interior surface 303 of the outer lens 106 is a more efficient and cost-effective construction of an outer lens 106 and AR lens 410.

As described above with reference to the ray diagram 210 of FIG. 2B, the see-through corrector lens 209 includes the seventh surface 280 and the eighth surface 290. Similar to the integrated lens 300 of FIG. 3A, in the integrated lens 600 of FIG. 6A, the seventh surface 280 and the interior surface 303 are on the same side of the outer lens 106. The see-through corrector lens 209 may be integrated with the outer lens 106 is various manners, as described above with reference to FIG. 3A. When constructing the NED 100 with the embodiment of the AR lens 410 construction 601 and the outer lens 106 shown in FIG. 6A, the AR lens 410 construction 601 may be coupled to the outer lens 106 such that the sixth surface 270 of the main prism lens 206 is drawn toward the seventh surface 280 of the see-through corrector lens 209 until the main prism lens 206 abuts the see-through corrector lens 209.

Referring now to FIG. 6B, shown is a diagram of an integrated lens 620 including both the AR lens 410 construction 603 and the outer lens 106 according to various embodiments of the disclosure. The integrated lens 620 shown in FIG. 6B is similar to the integrated lens 600 shown in FIG. 6A, except that the integrated lens 620 illustrates how the display corrector lens 403 is integrated with the outer lens 106. In addition, the AR lens 410 included in the AR lens 410 construction 603 includes the main prism lens 206 and the see-through corrector lens 209.

The AR lens 410 construction 603 includes the micro-display panel 121 and the AR lens 410. Similar to the AR lens 410 construction 601 described above with reference to FIG. 6A, the AR lens 410 construction 603 shown in FIG. 6B also includes the micro-display panel 121 interconnected with the AR lens 410 by the joint 311.

As described above with reference to FIG. 2B, the main prism lens 206 includes the fourth surface 250, the fifth surface 260, and the sixth surface 270. The see-through corrector lens 209 includes the seventh surface 280 and the eighth surface 290. Within the AR lens 410 of the integrated lens 620, the main prism lens 206 and the see-through corrector lens 209 are coupled, or attached together, using glue bonding, or any other type of bonding or fastening process that can attach plastic or polycarbonate materials together.

Similar to the outer lens 106 defined above with reference to FIG. 6A, the outer lens 106 shown in FIG. 6B comprises an interior surface 303, an exterior surface 306, and a mirror surface 415. Unlike the outer lens 106 defined above with reference to FIG. 6A, the outer lens 106 shown in FIG. 6B comprises the display corrector lens 403 (instead of the see-through corrector lens 209).

As described above with reference to the ray diagram 421 of FIG. 4B, the display corrector lens 403 includes the first surface 420 and the third surface 240. In the embodiment of the integrated lens 620 shown in FIG. 6B, first surface 420, the third surface 240, and the interior surface 303 are on the same side of the outer lens 106. The display corrector lens 403 may be integrated with the outer lens 106 in various manners, which are described above with reference to FIGS. 3A-B. When constructing the NED 100 with the embodiment of the AR lens 410 construction 603 and the outer lens 106 shown in FIG. 6B, the AR lens 410 construction 603 may be coupled to the outer lens 106 such that the fourth surface 250 of the main prism lens 206 is drawn toward the third surface 240 of the display corrector lens 403 until the main prism lens 206 abuts the display corrector lens 403.

Referring now to FIG. 6C, shown is a diagram of an integrated lens 630 including both the AR lens 410 construction 606 and the outer lens 106 according to various embodiments of the disclosure. The integrated lens 630 shown in FIG. 6C is similar to the integrated lens 600 shown in FIG. 6A and the integrated lens 620 shown in FIG. 6B, except that the integrated lens 630 illustrates that the outer lens 106 includes the display corrector lens 403 and the see-through corrector lens 209. In addition, the AR lens 410 included in the AR lens 410 construction 606 only includes the main prism lens 206.

The AR lens 410 construction 606 includes the micro-display panel 121 and the AR lens 410. Similar to the AR lens 410 construction 601 and 603 described above with reference to FIGS. 6A-B, the AR lens 410 construction 606 shown in FIG. 6C also includes the micro-display panel 121 interconnected with the AR lens 410 by the joint 311. As described above with reference to FIG. 2B, the main prism lens 206 includes the fourth surface 250, the fifth surface 260, and the sixth surface 270, and the see-through corrector lens 209 includes the seventh surface 280 and eighth surface 290.

Similar to the outer lenses 106 defined above with reference to FIGS. 6A-B, the outer lens 106 comprises an interior surface 303, an exterior surface 306, and a mirror surface 415. Unlike the outer lenses 106 defined above with reference to FIGS. 6A-B, the outer lens 106 shown in FIG. 6C comprises both the display corrector lens 403 and the see-through corrector lens 209 (instead of just the display corrector lens 403 or the see-through corrector lens 209). In this embodiment, the first surface 420, the third surface 240, the seventh surface 280, and the interior surface 303 are on the same side of the outer lens 106. In this embodiment, the display corrector lens 403 is disposed above the see-through corrector lens 209.

The outer lens 106 is constructed to include the see-through corrector lens 209 in a manner similar to that which is described above with reference to FIGS. 3A and 6A. The outer lens 106 is constructed to include the display corrector lens 403 in a manner similar to that which is described above with reference to FIGS. 3B and 6B. When constructing the NED 100 with the embodiment of the AR lens 410 construction 606 and the outer lens 106 shown in FIG. 6C, the AR lens 410 construction 606 may be coupled to the outer lens 106 such that the fourth surface 250 of the main prism lens 206 is drawn toward the third surface 240 of the display corrector lens 403 and the sixth surface 270 of the main prism lens 206 is drawn toward the seventh surface 280 of the see-through corrector lens 209. In this way, the main prism lens 206 abuts the display corrector lens 403 and the see-through corrector lens 209 when the AR lens 410 construction 606 and the outer lens 106 are drawn together.

As shown by FIGS. 6A-C, respectively, when the NED 100 is constructed to include the AR lens 410 and the outer lens 106 integrated together, the depth of the lens portion of the NED 100 is reduced greatly. By reducing the depth of the lens portion of the NED 100, the NED 100 more closely resembles the shape of a standard prescription eyeglass or standard sunglass, and thus, becomes more aesthetically appealing to a user or potential customer. Reducing the depth of the lens portion of the NED 100 may also reduce the amount of materials, and thus the cost, required to manufacture an NED 100.

FIGS. 6A-C describe various methods of integrating the AR lens 410 with the outer lens 106 to create integrated lens 600, 620, and 630. In an embodiment, the term "integrating" refers to forming the integrated lens 600, 620, and 630 from a monolithic segment including one or more of the prisms (e.g., display corrector lens 403, main prism lens 206, and see-through corrector lens 209) of the AR lens 410 and the outer lens 106 at a single time. In this embodiment, the monolithic segment may have always remained as a single piece that was never separated during formation of the integrated lens 600, 620, and 630. In this way, the integrated lenses 600, 620, and 630 are also formed from a single, monolithic segment including one or more of the prisms of the AR lens 410 and the outer lens 106 at a single time.

FIG. 6D is a ray diagram 640 illustrating a display path within the AR lens 410 and the outer lens 106 according to various embodiments of the disclosure. The ray diagram 640 applies to the integrated lens 600, 620, and 630 after securing the AR lens 410 with the outer lens 106, which may comprise the mirror surface 415 and the see-through corrector lens 209 and/or the display corrector lens 403.

As shown by FIG. 6D, the integration of the AR lens 410 and the outer lens 106 with the mirror surface 415 creates a non see-through optical area 650 and a see-through optical area 660. The non see-through optical area 650 includes the mirror surface 415, the display corrector lens 403, and a top portion 670 of the outer lens 106. In an embodiment, the non see-through optical area 650 may also include a portion of the main prism lens 206. The see-through optical area 660 includes another portion of the main prism lens 206, the see-through corrector lens 209, and a bottom portion 673 of the outer lens 106.

As described above, in operation, the micro-display panel 121 generates and outputs one or more images for display and projects the images to the mirror surface 415 of the outer lens 106. The mirror surface 415 reflects the images to the display corrector lens 403. As described above, the display corrector lens 403 may be part of the outer lens 106. In addition, as described above, the eighth surface 290 may be part of the outer lens 106.

Figure 7:
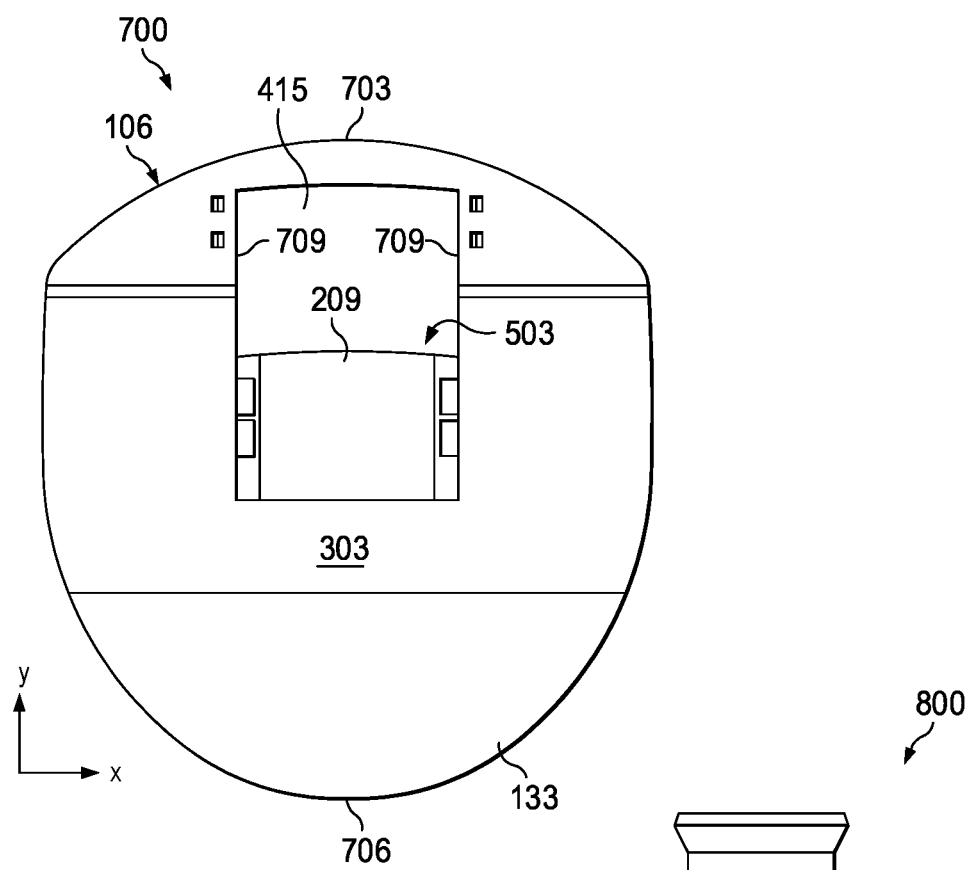
FIG. 7 is a diagram illustrating an interior of an outer lens according to various embodiments of the disclosure.

FIG. 7 is a diagram illustrating an interior 700 of an outer lens 106 including a see-through corrector lens 209 according to various embodiments of the disclosure. The outer lens 106 shown in FIG. 7 may be the interior 700 of the outer lens 106 shown in FIG. 5. The interior 700 of the outer lens 106 is the side of the outer lens 106 that faces the user wearing the NED 100.

The interior 700 of the outer lens 106 includes a top edge 703, a bottom edge 706, the interior surface 303, the mirror surface 415, the see-through corrector lens 209, the recess 503, and the edge 133. The top edge 703 of the outer lens 106 is proximate to the micro-display panel 121 (not shown) when the NED 100 (not shown) is constructed with the outer lens 106 shown in FIG. 7. The bottom edge 706 of outer lens 106 rests proximate to the user's face when the user is wearing the NED 100. For this reason, the bottom edge 706 includes an edge 133, which tapers down with respect to the Y-axis parallel to the slope of the user's face. The edge 133 provides a more comfortable experience for the user wearing the NED 100 with the outer lens 106 shown in FIG. 7.

As shown by FIG. 7, the mirror surface 415 is disposed toward the top of the interior 700 above the recess 503 and the see-through corrector lens 209. The recess 503 includes sidewalls 709, and, as described above, the recess 503 and the sidewalls 709 are shaped to receive and secure the AR lens 410 to the outer lens 106.

The see-through corrector lens 209 is formed as part of the outer lens 106 and positioned below the recess 503. The see-through corrector lens 209 may be positioned as part of the outer lens 106 in a manner similar to that described above with reference to FIG. 3A or FIG. 6A.

Figure 8A:
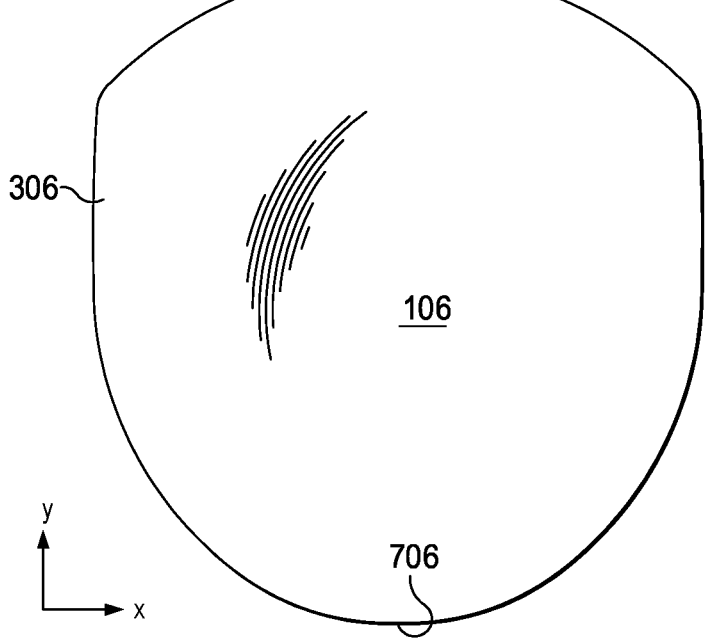
FIGS. 8A-C are diagrams illustrating various views of an exterior surface of the outer lens according to various embodiments of the disclosure.
Figures 8B, 8C:
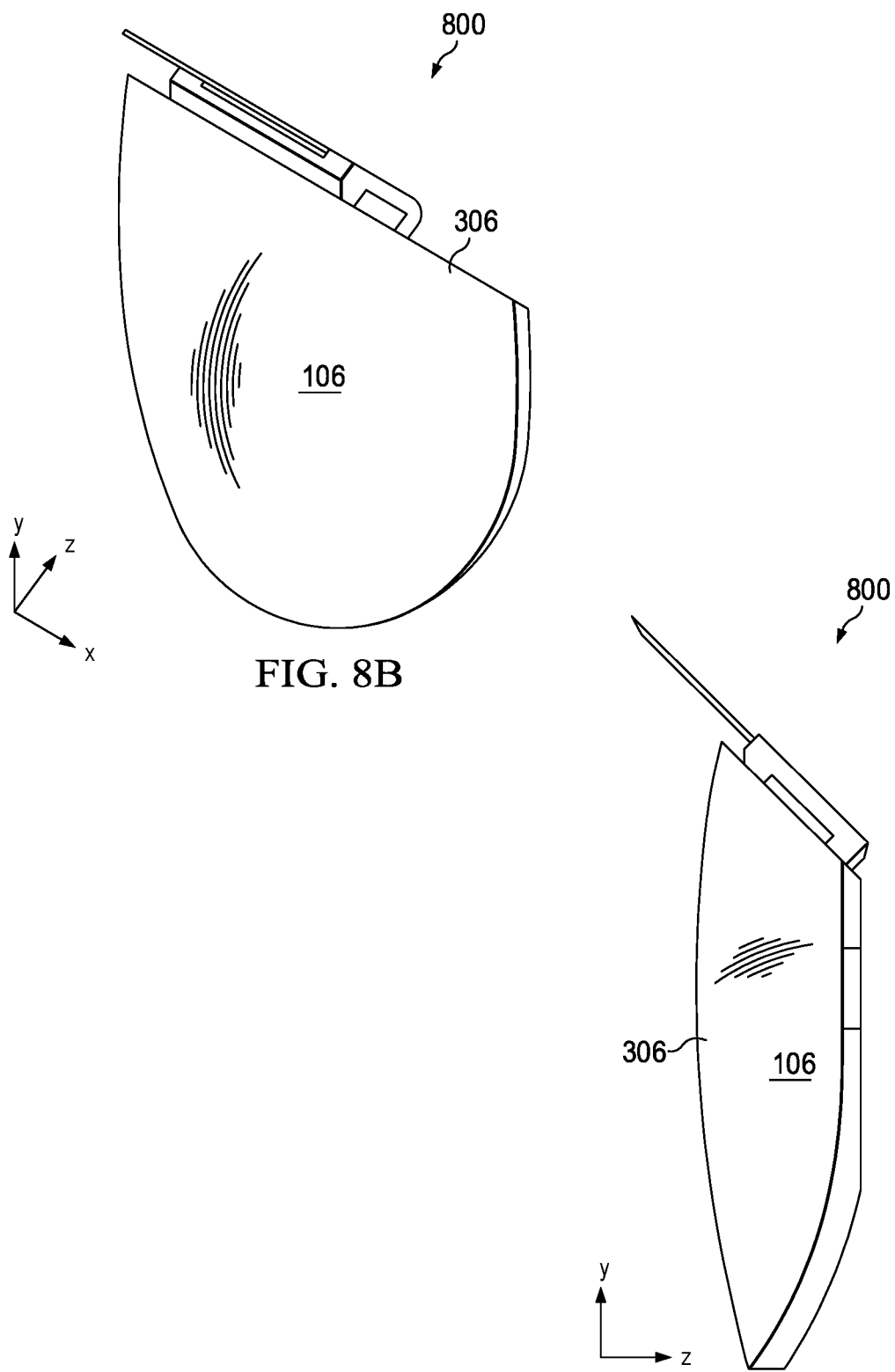

FIGS. 8A-C are diagrams illustrating various views of an exterior surface 306 of the outer lens 106 according to various embodiments of the disclosure. In particular, FIG. 8A shows a front view 800 of an outer lens 106 according to various embodiments of the disclosure. As shown by FIG. 8A, the exterior surface 306 includes a smooth convex curvature relative to both the X-axis and Y-axis. In an embodiment, the exterior surface 306 includes a gradient tinting, in which the exterior surface 306 fades from dark to light from the top edge 703 to the bottom edge 706 of the outer lens 106. FIGS. 8B-C are also diagrams that illustrate the outer lens 106 being convexly curved relative to both the X-axis and Y-axis.

Figure 9:
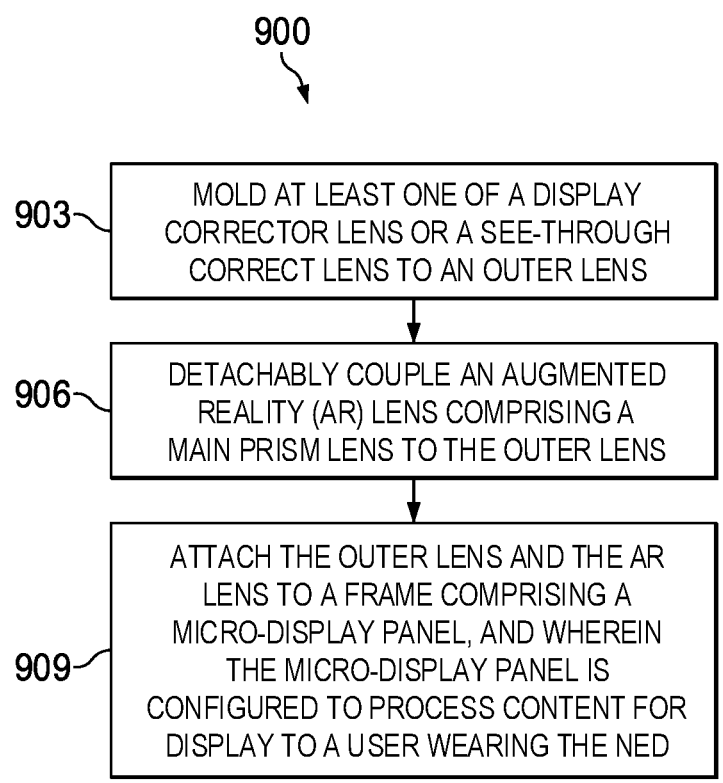
FIG. 9 is a flowchart illustrating a method for manufacturing an NED with an outer lens according to various embodiments of the disclosure.

FIG. 9 is a flowchart illustrating a method 900 for manufacturing an NED 100 according to various embodiments of the disclosure. A manufacturer implements the method 900. Alternatively, multiple manufacturers implement the method 900. In an embodiment, method 900 may be implemented after the frame 103 of the NED 100 has been assembled together to include at least the component parts shown and described above with reference to FIGS. 1A-B.

At step 903, a display corrector lens 203 or 403 and/or a see-through corrector lens 209 is molded to an outer lens 106 of an NED 100. In an embodiment, a see-through corrector lens 209 is molded to the outer lens 106 as described above with reference to FIGS. 3A and 6A. In an embodiment, the display corrector lens 203 is molded to an outer lens 106 as described above with reference to FIG. 3B. In an embodiment, the display corrector lens 403 is molded to an outer lens 106 as described above with reference to FIG. 6B. In an embodiment, both the display corrector lens 203 and the see-through corrector lens 209 are molded to the outer lens 106 as described above with reference to FIG. 3C. In an embodiment, both the display corrector lens 403 and the see-through corrector lens 209 are molded to the outer lens 106 as described above with reference to FIG. 6C. In an embodiment, the display corrector lens 203 or 403 and/or the see-through corrector lens 209 is molded to the outer lens 106 using for, example, various methods of injection molding.

In an embodiment, the outer lens 106 is formed to include the see-through corrector lens 209 and then extended upward relative to the Y-axis to the top edge 703 of the outer lens 106 to create the outer lens 106 having a continuous and smooth surface. In this embodiment, the display corrector lenses 203 and 403 may be separately attached to the outer lens 106. In this embodiment, a gap may or may not be present between the display corrector lens 203 or 403 and the outer lens 106.

In another embodiment, the outer lens 106 is formed to include display corrector lens 203 and then extended downward relative to the Y-axis to the bottom edge 706 of the outer lens 106 to create the outer lens 106 having a continuous and smooth surface. In this embodiment, the see-through corrector lens 209 may be separately attached to the outer lens 106. In this embodiment, a gap may or may not be present between the see-through corrector lens 209 and the outer lens 106.

In yet another embodiment, the outer lens 106 is formed to include mirror surface 415 and the display corrector lens 403 and then extended downward relative to the Y-axis to the bottom edge 706 of the outer lens 106 to create the outer lens 106 having a continuous and smooth surface. In this embodiment, the see-through corrector lens 209 may be separately attached to the outer lens 106. In this embodiment, a gap may or may not be present between the see-through corrector lens 209 and the outer lens 106.

At step 906, an AR lens 110 or 410 comprising at least a main prism lens 206 is detachably coupled to the outer lens 106. In an embodiment, the AR lens 110 or 410 includes the main prism lens 206 and the display corrector lens 203 or 403, as described above with reference to FIGS. 3A and 6A. In an embodiment, the AR lens 110 or 410 includes the main prism lens 206 and the see-through corrector lens 209, as described above with reference to FIGS. 3B and 6B. In an embodiment, the AR lens 110 or 410 only includes the main prism lens 206, as described above with reference to FIGS. 3C and 6C.

At step 909, the outer lens 106, integrated with the AR lens 110 or 410, is attached to a frame 103 comprising a micro-display panel 121. In an embodiment, the micro-display panel 121 comprises a processor 123 configured to process content for display to a user wearing the NED 100. In one embodiment, the outer lens 106, integrated with the AR lens 110 or 410, is bonded to the frame 103 using, for example, glue. In another embodiment, the outer lens 106, integrated with the AR lens 110 or 410, is attached to the frame 103 using the joint 311.

In an embodiment, an apparatus comprises a frame 103, comprising an outer lens 106, a micro-display panel 121, and an AR lens 110 or 410. The micro-display panel 121 is coupled to the frame 103 and comprises a processor 123 configured to process content for display to a user wearing the apparatus. The AR lens 110 or 410 comprises the main prism lens 106. In various embodiments, the outer lens 106 comprises at least one of a display corrector lens 203 or 403 or a see-through corrector lens 209.

In an embodiment, the disclosure includes a means for molding at least one of a display corrector lens or a see-through corrector lens to an outer lens of the NED, detachably coupling an augmented reality (AR) lens comprising a main prism lens to the outer lens, and attaching the outer lens and the AR lens to a frame of the NED, wherein the frame comprises a micro-display panel configured to process content for display to a user wearing the NED.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A near-eye display (NED), comprising:
a frame comprising an outer lens,
a micro-display panel coupled to the frame and comprising a processor configured to process content for display to a user wearing the NED; and
an augmented reality (AR) lens comprising a main prism lens,
wherein the outer lens is molded to at least one of a display corrector lens or a see-through corrector lens.

2. The NED of claim 1, wherein the outer lens is detachably coupled to the AR lens.

3. The NED of claim 1, wherein the outer lens comprises a recess configured to receive and secure at least one of the display corrector lens or the see-through corrector lens.

4. The NED of claim 1, further comprising an edge that at least partially surrounds the AR lens.

5. The NED of claim 1, wherein an interior surface of the outer lens comprises a mirror surface.

6. The NED of claim 1, wherein the outer lens has a continuous surface and is convexly curved.

7. The NED of claim 1, wherein the outer lens comprises the display corrector lens, and wherein a surface of the main prism lens on the AR lens abuts a surface of the display corrector lens on the outer lens.

8. The NED of claim 1, wherein the outer lens comprises the see-through corrector lens, and wherein a surface of the main prism lens on the AR lens abuts a surface of the see-through corrector lens on the outer lens.

9. The NED of claim 1, wherein the content passes through the display corrector lens, the main prism lens, and the see-through corrector lens before being presented to the user with an external environment.

10. A method for manufacturing a near-end display (NED), comprising:
molding at least one of a display corrector lens or a see-through corrector lens to an outer lens of the NED;
detachably coupling an augmented reality (AR) lens comprising a main prism lens to the outer lens; and
attaching the outer lens and the AR lens to a frame of the NED, wherein the frame comprises a micro-display panel configured to process content for display to a user wearing the NED.

11. The method of claim 10, wherein molding the at least one of the display corrector lens or the see-through corrector lens to the outer lens comprises:
molding the display corrector lens to the outer lens; and
extending the display corrector lens to a bottom surface of the outer lens to form a continuous exterior surface of the outer lens.

12. The method of claim 10, wherein molding the at least one of the display corrector lens or the see-through corrector lens to the outer lens comprises:
molding the see-through corrector lens to the outer lens; and
extending the see-through corrector lens to a top surface of the outer lens to form a continuous exterior surface of the outer lens.

13. The method of claim 10, wherein the display corrector lens or the see-through corrector lens is molded to the outer lens using plastic injection molding.

14. A near-end display (NED), comprising:
an augmented reality (AR) lens comprising a main prism lens;
an outer lens detachably coupled to the AR lens and molded to at least one of a see-through corrector lens or a display corrector lens; and a micro-display panel coupled to the AR lens and the outer lens, wherein the micro-display panel is configured to process content for display to a user wearing the NED through the AR lens.

15. The NED of claim 14, wherein the outer lens comprises the see-through corrector lens, and wherein the AR lens comprises the main prism lens and the display corrector lens.

16. The NED of claim 14, wherein the outer lens comprises a display corrector lens positioned proximate to a top edge of the outer lens, and wherein the AR lens further comprises the main prism lens and the see-through corrector lens.

17. The NED of claim 14, wherein the outer lens comprises the see-through corrector lens and the display corrector lens.

18. The NED of claim 14, wherein the outer lens comprises a mirror surface and the see-through corrector lens, and wherein the AR lens comprises the main prism lens and the display corrector lens.

19. The NED of claim 14, wherein the outer lens comprises a mirror surface proximate to a top edge of the outer lens, and wherein the outer lens comprises the display corrector lens positioned below the mirror surface, and wherein the AR lens further comprises the main prism lens and the see-through corrector lens.

20. The NED of claim 14, wherein the outer lens comprises a mirror surface, the see-through corrector lens, and the display corrector lens.

* * * * *